United States Patent
Hong et al.

(10) Patent No.: US 12,492,830 B2
(45) Date of Patent: Dec. 9, 2025

(54) HUMIDIFIER

(71) Applicant: COWAY CO., LTD., Chungcheongnam-do (KR)

(72) Inventors: Hyun-Jin Hong, Seoul (KR); An-Ho Cho, Seoul (KR)

(73) Assignee: COWAY Co., Ltd., Chungcheongnam-do (KR)

( * ) Notice: Subject to any disclaimer, the term of this patent is extended or adjusted under 35 U.S.C. 154(b) by 618 days.

(21) Appl. No.: 17/911,473

(22) PCT Filed: Mar. 25, 2021

(86) PCT No.: PCT/KR2021/003710
§ 371 (c)(1),
(2) Date: Sep. 14, 2022

(87) PCT Pub. No.: WO2021/194277
PCT Pub. Date: Sep. 30, 2021

(65) Prior Publication Data
US 2023/0093557 A1    Mar. 23, 2023

(30) Foreign Application Priority Data
Mar. 27, 2020   (KR) .................. 10-2020-0037325

(51) Int. Cl.
*B01D 53/02*    (2006.01)
*B01D 46/00*    (2022.01)
(Continued)

(52) U.S. Cl.
CPC .......... *F24F 6/043* (2013.01); *B01D 46/0027* (2013.01); *B01D 46/0047* (2013.01);
(Continued)

(58) Field of Classification Search
CPC ............ C12Q 1/6827; C12Q 2565/125; C12Q 2565/501; B01D 2273/30; B01D 2279/50;
(Continued)

(56) References Cited

U.S. PATENT DOCUMENTS 10,168,064 B1 * 1/2019 Zhang .................... F24F 6/12
12,013,150 B2 * 6/2024 Kim ......................... F24F 8/80
(Continued)

FOREIGN PATENT DOCUMENTS

CN    101280947 A    10/2008
CN    103649645 A     3/2014
(Continued)

OTHER PUBLICATIONS

Translation of JP06241511 (Year: 1994).*
(Continued)

*Primary Examiner* — Christopher P Jones
(74) *Attorney, Agent, or Firm* — Guntin & Gust, PLC; Miyoung Shin

(57) ABSTRACT

Provided is a humidifier comprising a housing including a suction port and a discharge port; a water container having an opening/closing valve; a water tank unit provided with a water tank, a humidifying member, a blower unit for providing air-blowing force, a water feed adjusting member installed on the water tank unit, a water feed operating member for moving the water feed adjusting member, and a controller for controlling an operation of the water feed operating member. The water feed adjusting member includes a space forming member having an opening, the opening guiding the water discharged from an outlet of the opening/closing valve to the water tank unit, and the space forming member includes a confinement space that may confine the water discharged from the outlet when the housing is inclined at a certain angle or greater.

11 Claims, 21 Drawing Sheets

(51) Int. Cl.
*F24F 6/04* (2006.01)
*F24F 8/108* (2021.01)
*F24F 11/00* (2018.01)
*F24F 13/20* (2006.01)
*F24F 6/00* (2006.01)
*F24F 140/00* (2018.01)

(52) U.S. Cl.
CPC .......... *F24F 8/108* (2021.01); *F24F 11/0008* (2013.01); *F24F 13/20* (2013.01); *B01D 2279/50* (2013.01); *F24F 2006/008* (2013.01); *F24F 2140/00* (2018.01)

(58) Field of Classification Search
CPC ........................ B01D 46/0027; B01D 46/0047; B01D 46/10; B01D 46/46; F24F 11/0008; F24F 13/20; F24F 2006/008; F24F 2140/00; F24F 6/043; F24F 8/108; Y02B 30/70
See application file for complete search history.

(56) References Cited

U.S. PATENT DOCUMENTS

| | | | | |
|---|---|---|---|---|
| 2007/0157928 | A1* | 7/2007 | Pujol | A61M 16/16 261/119.1 |
| 2010/0243432 | A1* | 9/2010 | Ikemizu | F24F 6/043 422/186 |
| 2014/0145355 | A1 | 5/2014 | Shimizu | |
| 2015/0021795 | A1 | 1/2015 | Bae et al. | |
| 2015/0241072 | A1* | 8/2015 | Kim | F24F 1/0323 236/44 C |
| 2017/0122594 | A1* | 5/2017 | Lee | F24F 6/04 |
| 2017/0267551 | A1* | 9/2017 | Saitou | C02F 1/4608 |
| 2017/0354988 | A1* | 12/2017 | Ohdou | F24F 6/06 |
| 2018/0100666 | A1* | 4/2018 | Park | F24F 11/30 |
| 2018/0299142 | A1* | 10/2018 | Myeong | F24F 1/04 |
| 2021/0293424 | A1* | 9/2021 | Lin | F24F 6/025 |

FOREIGN PATENT DOCUMENTS

| | | |
|---|---|---|
| CN | 104136856 A | 11/2014 |
| JP | 06241511 A | 8/1994 |
| JP | 2008025898 A | 2/2008 |
| KR | 20110001355 A | 1/2011 |
| KR | 1020120032393 A | 4/2012 |
| KR | 1020120113026 A | 10/2012 |
| KR | 101276044 B1 | 6/2013 |
| KR | 1020130099807 A | 9/2013 |
| KR | 1020160082375 A | 7/2016 |
| KR | 1020170127266 A | 11/2017 |
| KR | 20180073363 A | 7/2018 |
| KR | 20190001334 A | 1/2019 |
| WO | 2018113414 A1 | 6/2018 |

OTHER PUBLICATIONS

Translation of KR101276044 (Year: 2013).*
Translation of KR20160082375 (Year: 2016).*
Translation of KR20170127266 (Year: 2017).*
Chinese Office Action for Corresponding CN Application No. 202180024045.0, Jun. 11, 2024, 7 pages.
International Search Report issued in corresponding International Application No. PCT/KR2021/003710, English Translation, mailed Jul. 8, 2021, 5 pages.
Office Action for Corresponding JP Application No. JP 2020-217082, mailed Jan. 7, 2025, 3 pages.

* cited by examiner (a)

(b)

(a)

(b)

B-B'

I-I'

HUMIDIFIER

TECHNICAL FIELD

The present disclosure relates to a humidifier to increase humidity in the air, and more particularly, a humidifier which may adjust water supply from a water container to a water tank.

BACKGROUND ART

In general, a humidifier artificially generating and spraying moisture to increase indoor humidity may include a heating-type humidifier which sprays, into a room, water vapor generated by heating water stored in a water tank to a predetermined temperature according to a moisture generation method, an ultrasonic humidifier which sprays, into a room, fine water particles micronized by ultrasonically vibrating water stored in a water tank, and a combined humidifier using both a heating humidification method and an ultrasonic humidification method. Recently, a vaporization-type (blowing-type) humidifier which may perform humidification by immersing a humidifying member (humidifying filter) in a water tank and vaporizing water having moved to the humidifying member by blowing may be used.

These general humidifiers may use different humidification methods but may commonly use a method of supplying water from a water tank to a water container.

A general humidifier having a water tank and a water container may have a structure in which, when the water container is mounted on the water tank, an on/off valve coupled to an inlet port of the water container may be opened by a protrusion formed in the water tank and water may be supplied from the water container to the water tank. In this case, when the water level of the water tank coincides with the lower end of the outlet port of the on/off valve, air does not flow into the water container and the water stored in the water container may be no longer supplied to the water tank.

Accordingly, since the general humidifier is configured to maintain a constant water level in the water tank, even after humidification is terminated, water at a certain level may continue to remain in the water tank, and may cause mold, scale, and odor in the water tank or there may be a sanitation problem in that bacteria may multiply.

In particular, in the case of a general vaporizing-type humidifier, since humidification may be performed while a humidification filter may be immersed in the water contained in the water tank or a rotating disk is in contact with the water contained in the water tank, water may remain in the water tank and also in the humidifying member, which may cause sanitary problems as described above.

Also, a general humidifier having an air cleaning function may selectively perform an air cleaning mode and a humidifying mode, and even when humidification is not desired as in an air cleaning mode, water in the water tank and/or the humidifying member may continue to evaporate such that the humidification state may be maintained. Also, the general humidifier has a problem in that, even in the air cleaning mode in which water supply is not necessary, when the water level in the water tank is lowered, water may be supplied from the water container again, such that the contaminated state of the water tank may be continued.

Meanwhile, when the general humidifier is tilted while being used or moving, the water contained in the water tank may move in the tilted direction of the humidifier (water tank), such that a lower end of the outlet port of the on/off valve may increase further than the water level of the water tank and may be exposed to the air. In this case, since air is supplied into the water container through the outlet port of the water container, the water contained in the water container may continue to flow into the water tank and may overflow the upper end of the water tank and may leak to the outside.

To address this problem, generally, a technique in which, by adopting a structure in which a partition wall is formed in the water tank portion corresponding to the periphery of the outlet of the on/off valve, water may be prevented from being discharged from the water container even when a humidifier housing is tilted has been suggested.

However, this prior art may have a problem in that, since the partition wall is fixed to the water tank portion, it may be impossible to actively prevent the overflow of water corresponding to the degree of tilting of the humidifier.

REFERENCE (Reference 1) Korean Laid-Open Patent Publication No. 2012-0032393

(Reference 2) Korean Laid-Open Patent Publication No. 2013-0099807

SUMMARY OF INVENTION

Technical Problem

The present disclosure has been devised to address at least a portion of the problems of the prior art as described above and aims to provide a humidifier which may control whether water is supplied from a water container to a water tank, and may also reduce water flowing out of the water tank when the housing is tilted.

Another aspect of the present disclosure is to provide a humidifier having improved sanitation by reducing contamination or bacterial generation in a water tank and/or a humidifying member.

Another aspect of the present disclosure is to provide a humidifier which may dry a humidifying member and/or a water tank.

Another aspect of the present disclosure is to provide a humidifier which may supply water to a water tank or may block water supply according to a change in a flow path in the humidifier without using a driving means for supplying water to the water tank.

Another object of the present disclosure is to provide a humidifier in which a water tank may be easily cleaned.

Solution to Problem

As an aspect of the present disclosure, the present disclosure provides a humidifier including a housing having a suction port through which air is suctioned and a discharge port through which air is discharged; a water container mounted in the housing and including a water container body and an opening/closing valve coupled to the water container body and opened and closed to allow water contained in the water container body to be discharged; a water tank unit including a water tank accommodating the water discharged from the water container; a humidifying member for performing humidification using the water accommodated in the water tank; a blower unit for providing blowing force such that air flowing in from the suction port passes through an air flow path unit formed between the suction port and the discharge port and flows to the discharge port; a water feed adjusting member installed in the tank unit to move to an open position in which water is supplied from the water container to the water tank unit by opening the opening/closing valve, and a closed position in which water supply from the water container is cut off by closing the opening/closing valve; a water feed operating member in contact with the water feed adjusting member and moving the water feed adjusting member; and a controller for controlling driving of the water feed operating member such that the water feed adjusting member is disposed in the open position or the closed position, wherein the water feed adjusting member includes a space forming member having an opening for guiding water discharged from an outlet port of the opening/closing valve to the water tank unit, and wherein the space forming member includes a water confinement space for confining water discharged from the outlet port when the housing is tilted at a predetermined angle or more.

In this case, the water feed adjusting member may include a contact portion disposed to be pressurized by the water feed operating member, a lifting and lowering pressurizing portion integrally coupled to the space forming member and disposed to pressurize the opening/closing valve, and a rotating shaft portion connecting the contact portion to the lifting and lowering pressurizing portion.

Also, the contact portion may move in an upward and downward direction by driving of the water feed operating member, the lifting and lowering pressurizing portion may rotate around the rotating shaft in response to the movement of the contact portion in an upward and downward direction, and the open position may be a position in a state in which the lifting and lowering pressurizing portion rotates at a predetermined angle about the rotating shaft portion from the closed position.

Meanwhile, the humidifier may further include a tilt sensor for sensing tilting of the housing; wherein, when the tilting sensed by the tilt sensor is equal to or greater than a predetermined value, the controller may further control driving of the water feed operating member such that the water feed adjusting member may be disposed in the water feed cut-off position, and wherein the water feed cut-off position may be a position in a state in which the lifting and lowering pressurizing portion may rotate at an angle greater than a rotated angle when the lifting and lowering pressurizing portion moves from the closed position to the open position.

Also, the water tank unit may include a water tank cover for covering at least a portion of an upper portion of the water tank, and the water feed adjusting member may be installed in the water tank cover.

Also, the water container may be disposed eccentrically on one side of the water tank in a length direction, and an opening of the space forming member may be formed on one side of the water tank in the length direction.

Also, the space forming member may include a bottom surface corresponding to a lower surface of the outlet port in a state in which the water feed adjusting member is disposed in the open position, and a sidewall extending in an upward direction from the bottom surface to surround at least a portion of a circumference of the outlet port, and the water confinement space may be formed between the bottom surface and the sidewall when the housing is tilted at a predetermined angle or more.

In this case, the opening of the space forming member may be configured as an open end formed by opening one side of the sidewall, or a communication opening formed on one side of the bottom surface.

Meanwhile, the humidifier may further include an air purifying filter provided in the housing and filtering air flowing in from the suction port; and a flow path adjusting member rotatably disposed in the air flow path unit and adjusting an air flow to the discharge port, wherein the controller may control driving of the water feed operating member by controlling rotation of the flow path adjusting member.

In this case, the discharge port may include a humidified air discharge port through which air flowing into the suction port and passing through the air purifying filter is discharged through the humidifying member, and a clean air discharge port through which air is discharged without passing through the humidifying member, the flow path adjusting member may rotate between a humidifying mode position in which air flowing through the air flow path unit is discharged through the humidifying member and a clean mode position in which air is discharged without passing through the humidifying member, and when the flow path adjusting member is disposed in the humidification mode position, the water feed adjusting member may be disposed in the open position, and when the flow path adjusting member is disposed in the clean mode position, the water feed adjusting member may be disposed in the closed position.

Also, the flow path adjusting member may include a flow path adjusting body configured to intersect the air flow path unit to open and close at least a portion of the air flow path unit, and a shaft member forming a rotation center of the flow path adjusting body, and the water feed operating member may be coupled to the shaft member and may rotate together with the flow path adjusting member.

Advantageous Effects of Invention

According to an aspect of the present disclosure, using the water feed adjusting member, whether water is supplied from the water container to the water tank may be controlled, and by forming a water confinement space through the space forming member, the effect in which discharge of water to the outside of the water tank may be minimized when the housing is tilted may be obtained.

Also, according to an embodiment of the present disclosure, when the housing is tilted by driving the water feed adjusting member as the housing is tilted, the water supply from the water container to the water tank may be swiftly cut off.

Also, according to an embodiment of the present disclosure, the effect in which, by reducing contamination or the generation of bacteria in the water tank and/or humidifying member may be reduced, a sanitation improvement may be obtained.

Also, according to an embodiment of the present disclosure, the effect in which the humidifying member may be dried, and the water tank may also be dried.

Also, according to an embodiment of the present disclosure, since water may be supplied to the water tank or water supply is cut off according to the change in the flow path in the humidifier without using a driving means for supplying water to the water tank, the effect in which the number of driving means may be reduced, and the structure of the humidifier may be simplified may be obtained.

BEST MODE FOR INVENTION

Figure 1:
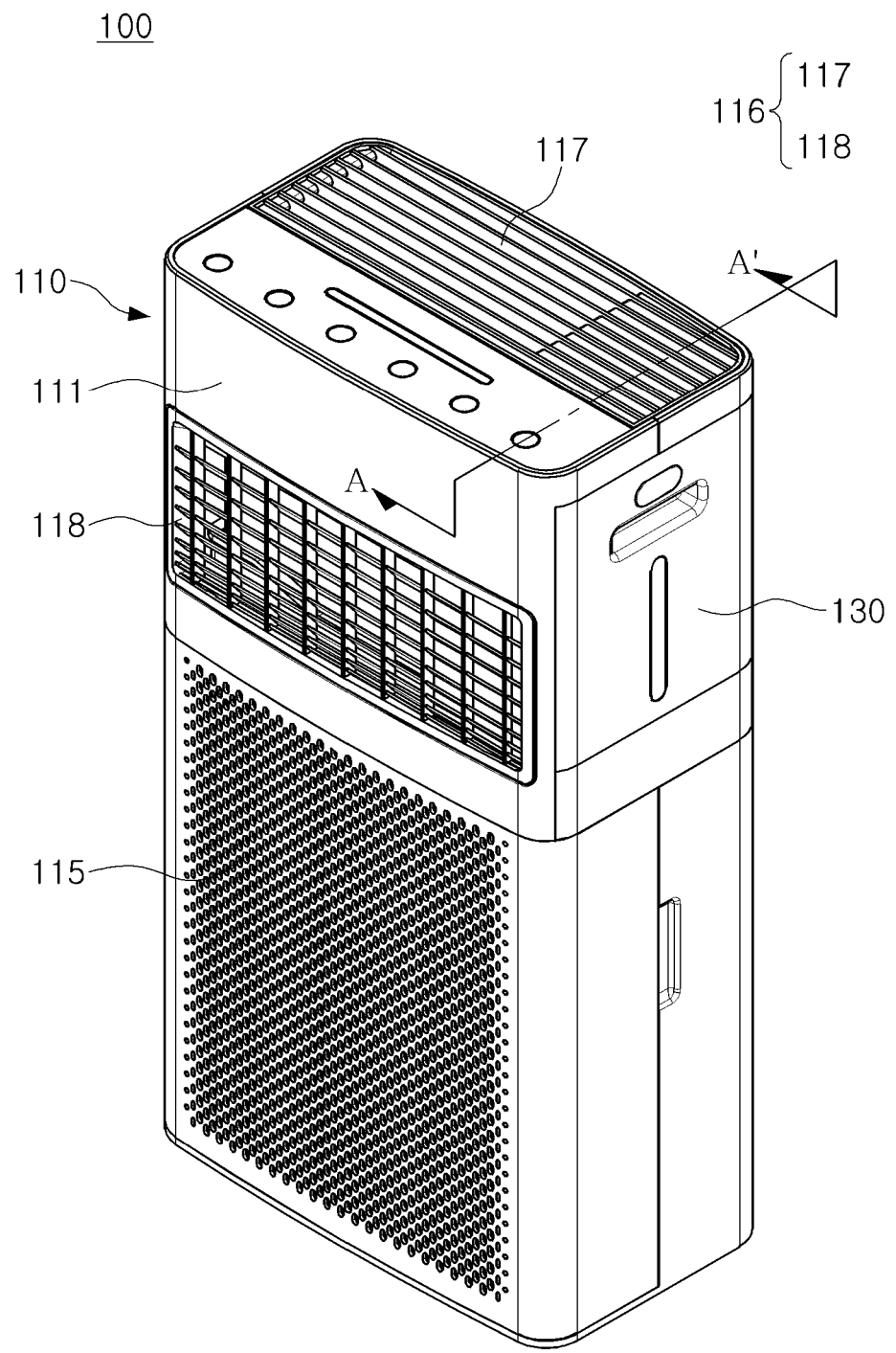
FIG. 1 is a perspective diagram illustrating a humidifier according to an embodiment of the present disclosure.

Hereinafter, preferred embodiments of the present disclosure will be described with reference to the accompanying drawings. However, the embodiment of the present disclosure may be modified in various other forms, and the scope of the present disclosure is not limited to the embodiments described below. Also, the embodiments of the present disclosure are provided to more completely explain the present disclosure to a person skilled in the art. The shapes and sizes of elements in the drawings may be exaggerated for clearer description.

Also, in this specification, a singular term includes a plural form unless otherwise indicated, and the same elements will be indicated by the same reference numerals.

The present disclosure relates to a humidifier 100 including a water container 130 and a water tank 141 and performing humidification. The humidifier 100 according to the present disclosure may also be applied to a humidifier (humidifier purifier) having other additional functions such as an air purifying function in addition to a humidifying function.

Hereinafter, for ease of description, a humidifier 100 which may perform humidification using a humidifying member 170 immersed in the water tank 141, and including a humidifying function and an air purifying function will be described as an example, but a specific humidification method, the type or shape of the humidifying member 170, whether additional functions other than the humidifying function are included, and the type of additional functions may be varied as long as the humidifier 100 according to the present disclosure may include the water container 130 and the water tank 141 and may perform humidification.

Hereinafter, the humidifier 100 and a method of controlling the same according to the present disclosure will be described with reference to the drawings.

First, with reference to FIGS. 1 to 17, the humidifier 100 according to an embodiment of the present disclosure will be described.

Figure 2:
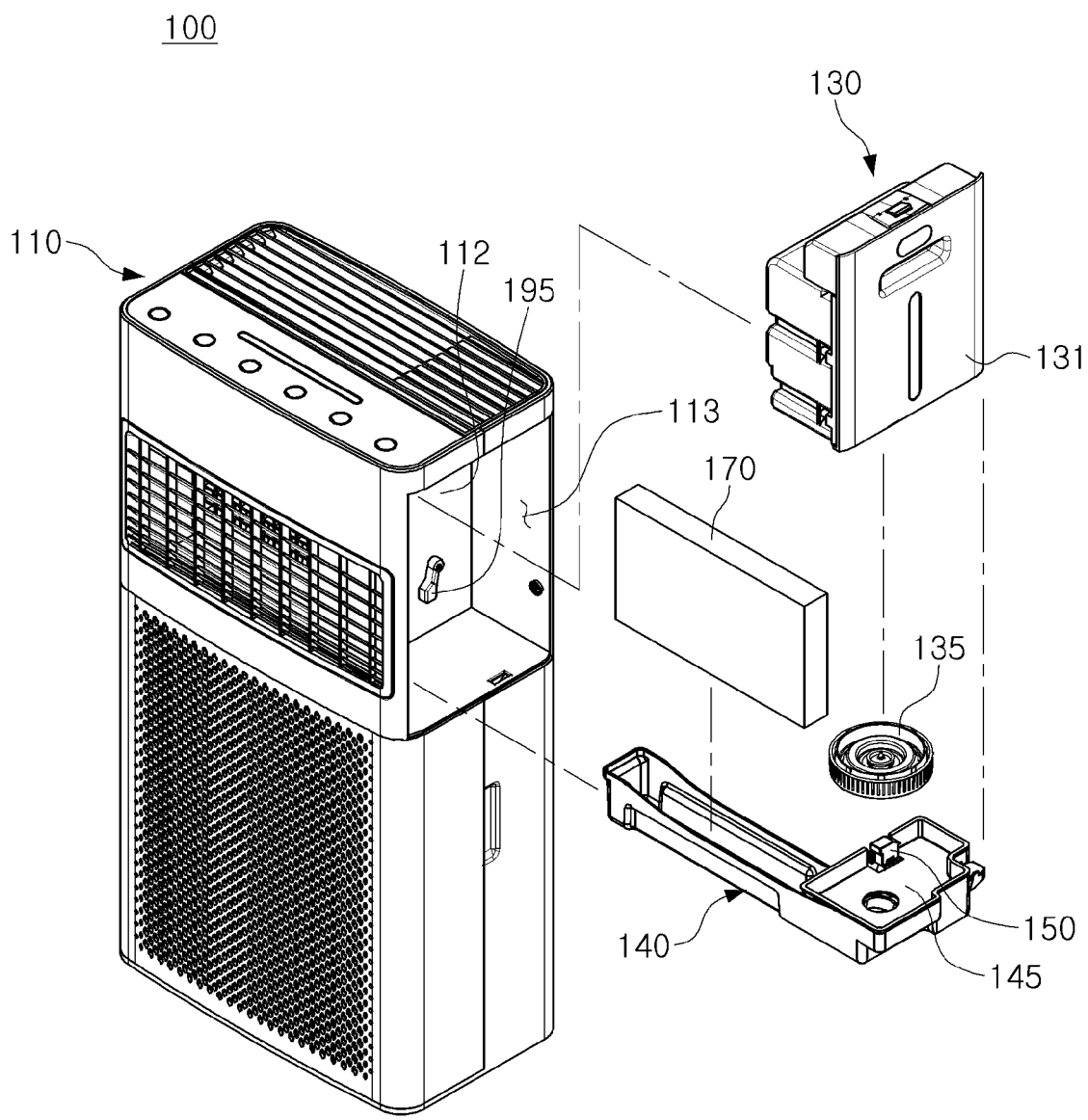
FIG. 2 is a perspective diagram illustrating a state in which a water container, a humidifying member, and a water tank unit are separated from the humidifier illustrated in FIG. 1.
Figure 3:
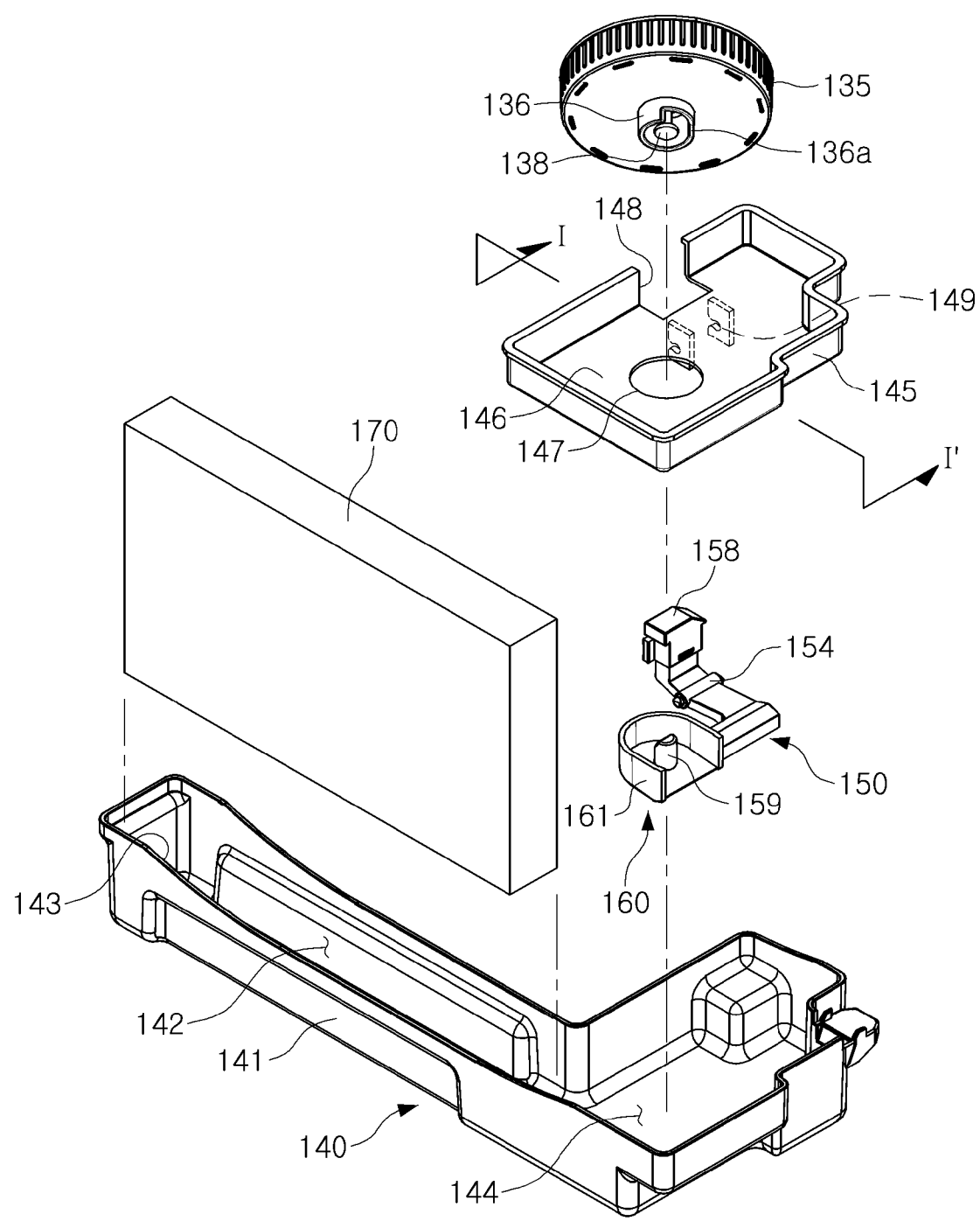
FIG. 3 is an exploded perspective diagram illustrating a water tank unit, a water feed adjusting member and a humidifying member illustrated in FIG. 2.
Figure 4:
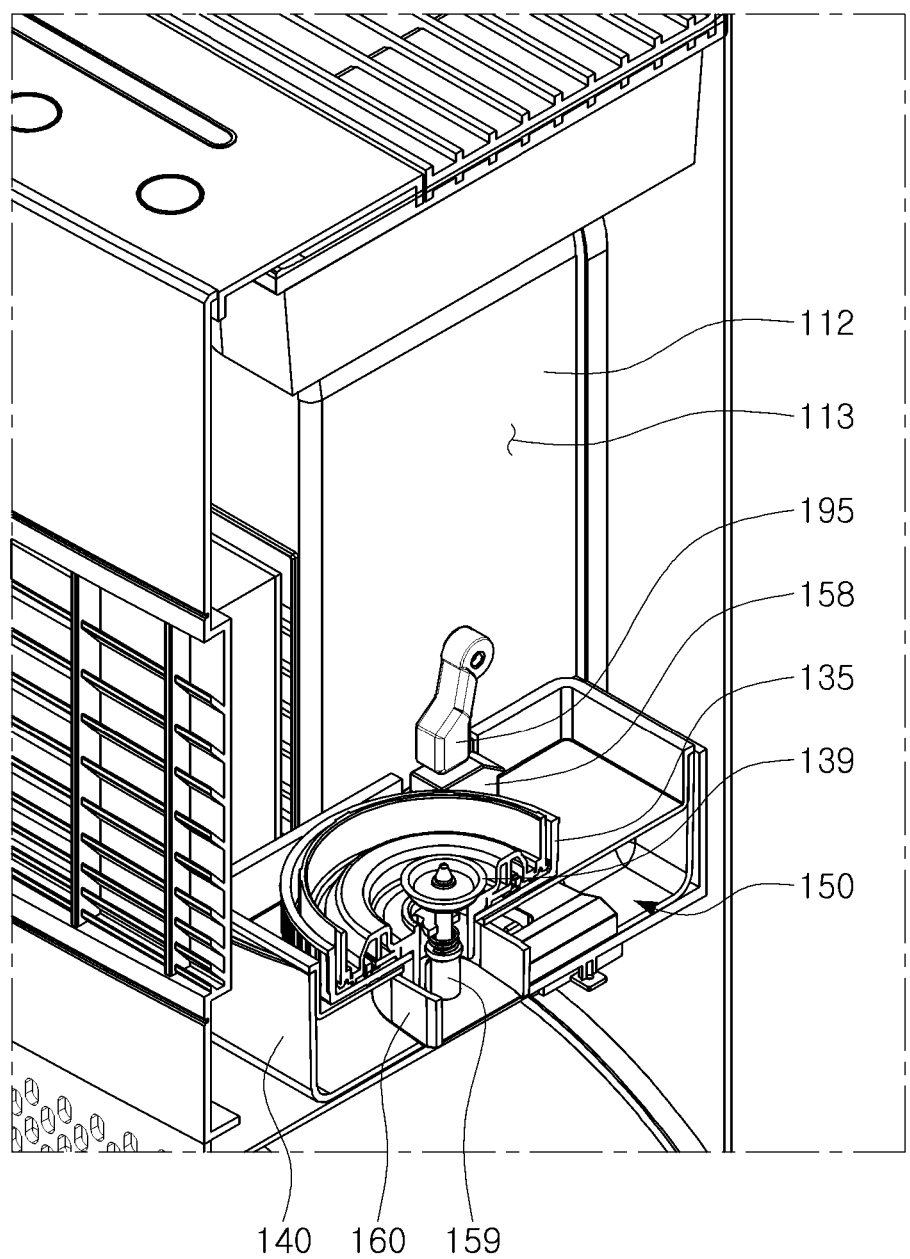
FIG. 4 is a cross-sectional diagram taken along line A-A' in FIG. 1 after a water container body is removed from the humidifier illustrated in FIG. 1.
Figure 5:
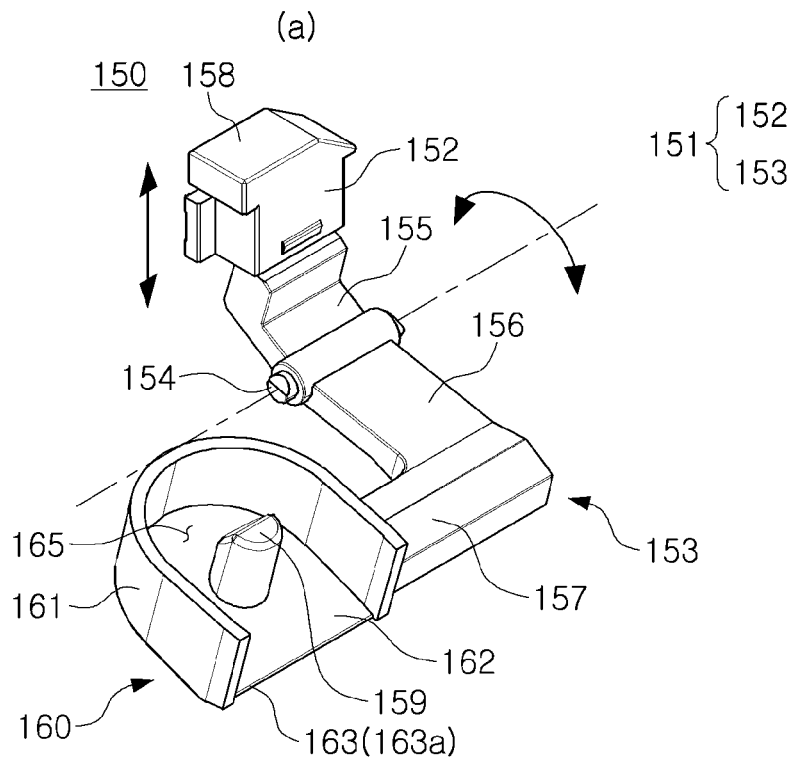
FIG. 5 is a perspective diagram illustrating the water feed adjusting member illustrated in FIG. 3, where (a) is a perspective diagram illustrating the state in a closed position, and (b) is a perspective diagram illustrating the state in an open position.
Figure 5:
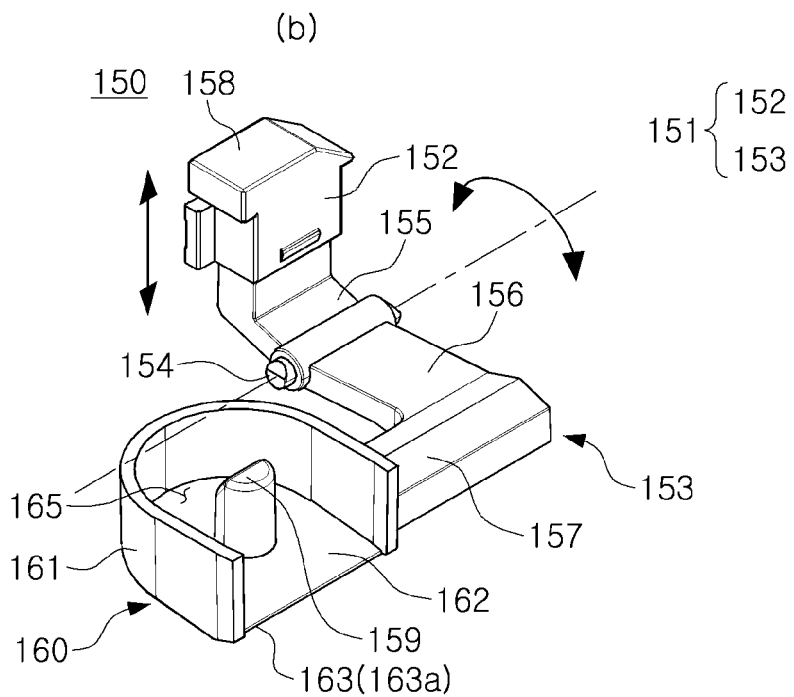
Figure 6:
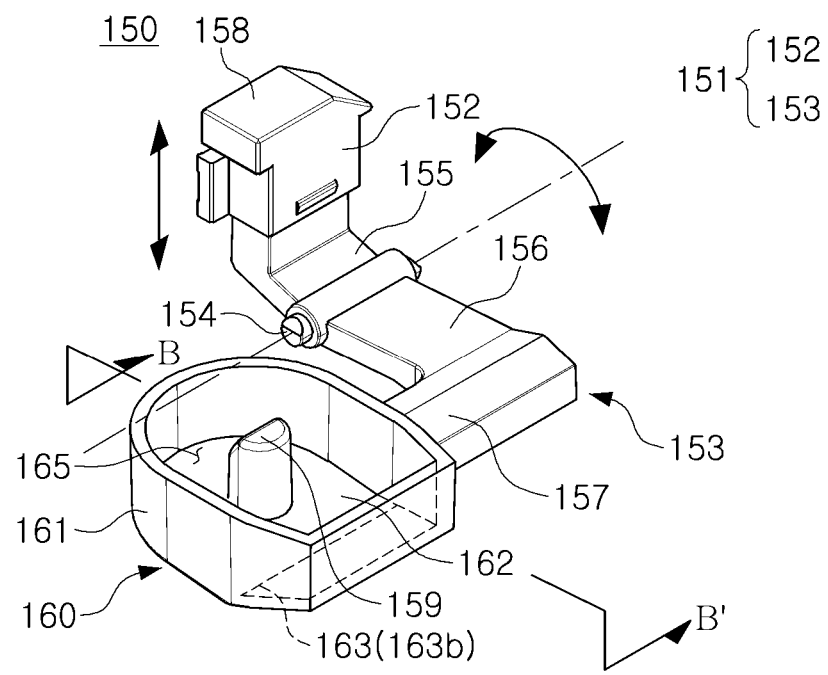
FIG. 6 is a diagram illustrating a modified example of a water feed adjusting member illustrated in FIG. 5, where (a) is a perspective diagram in the open position, and (b) is a cross-sectional diagram taken along line B-B' in (a).
Figure 6:
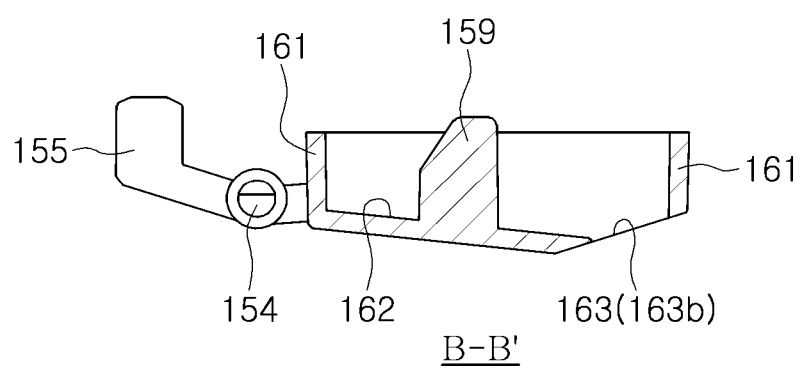
Figure 7:
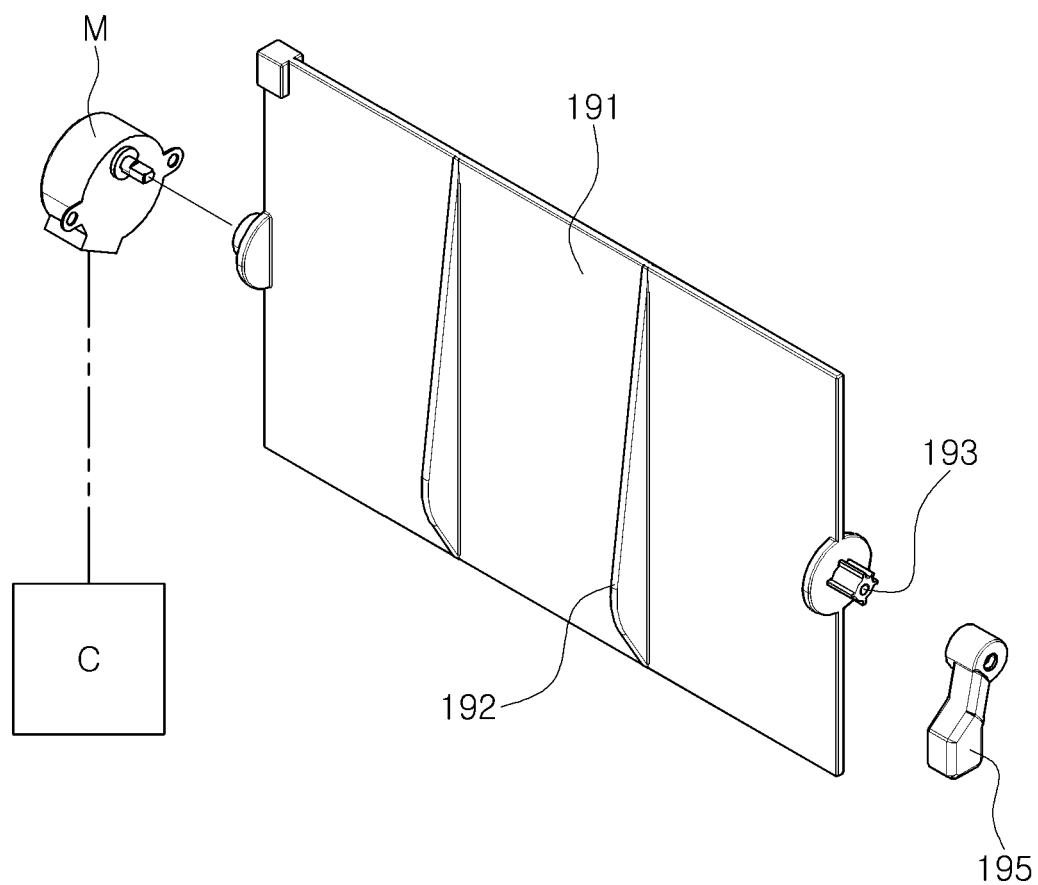
FIG. 7 is a perspective diagram illustrating a flow path control member and a water supply operation member provided in a humidifier according to an embodiment of the present disclosure.
Figure 8:
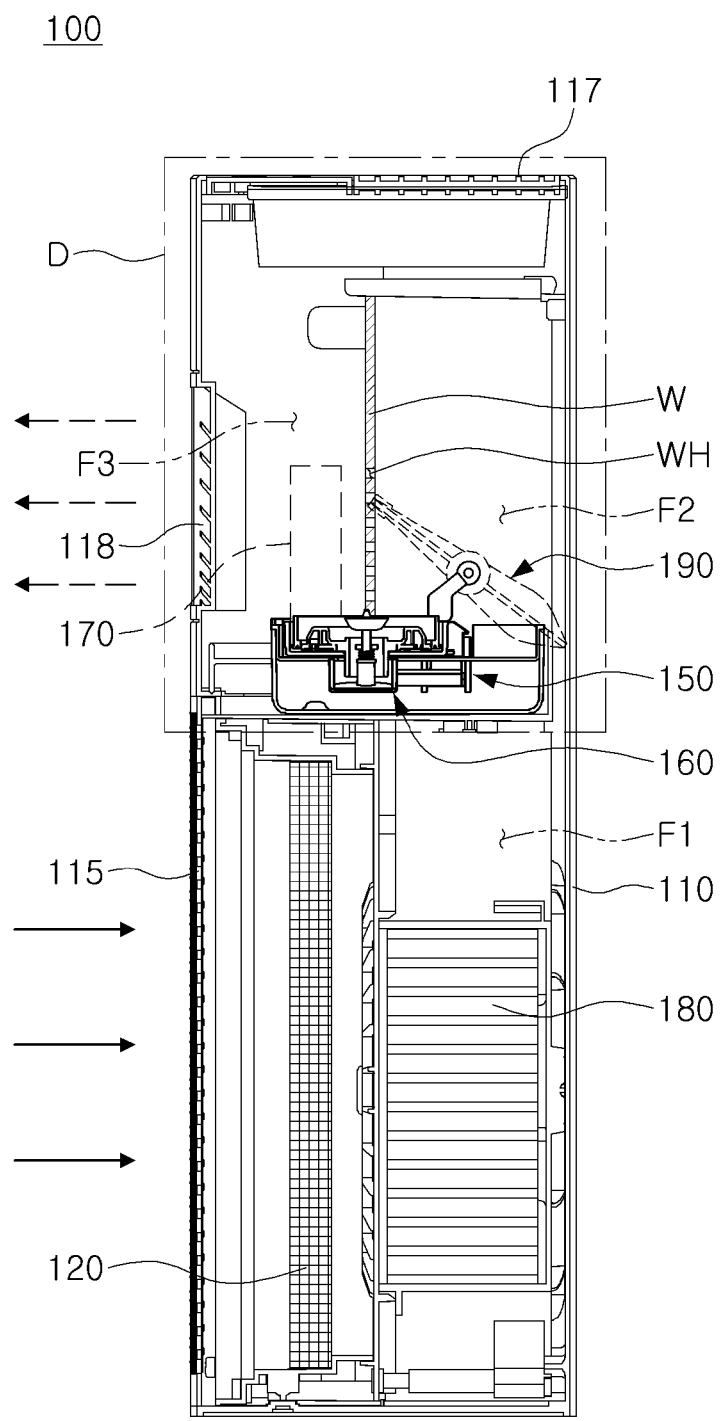
FIG. 8 is a cross-sectional diagram illustrating the humidifier illustrated in FIG. 1, where the upper side portion is a cross-sectional diagram illustrating the state in which the water container body is removed, taken along line A-A' in FIG. 1, and the lower side portion is a cross-sectional diagram illustrating a central portion of a housing.
Figure 9:
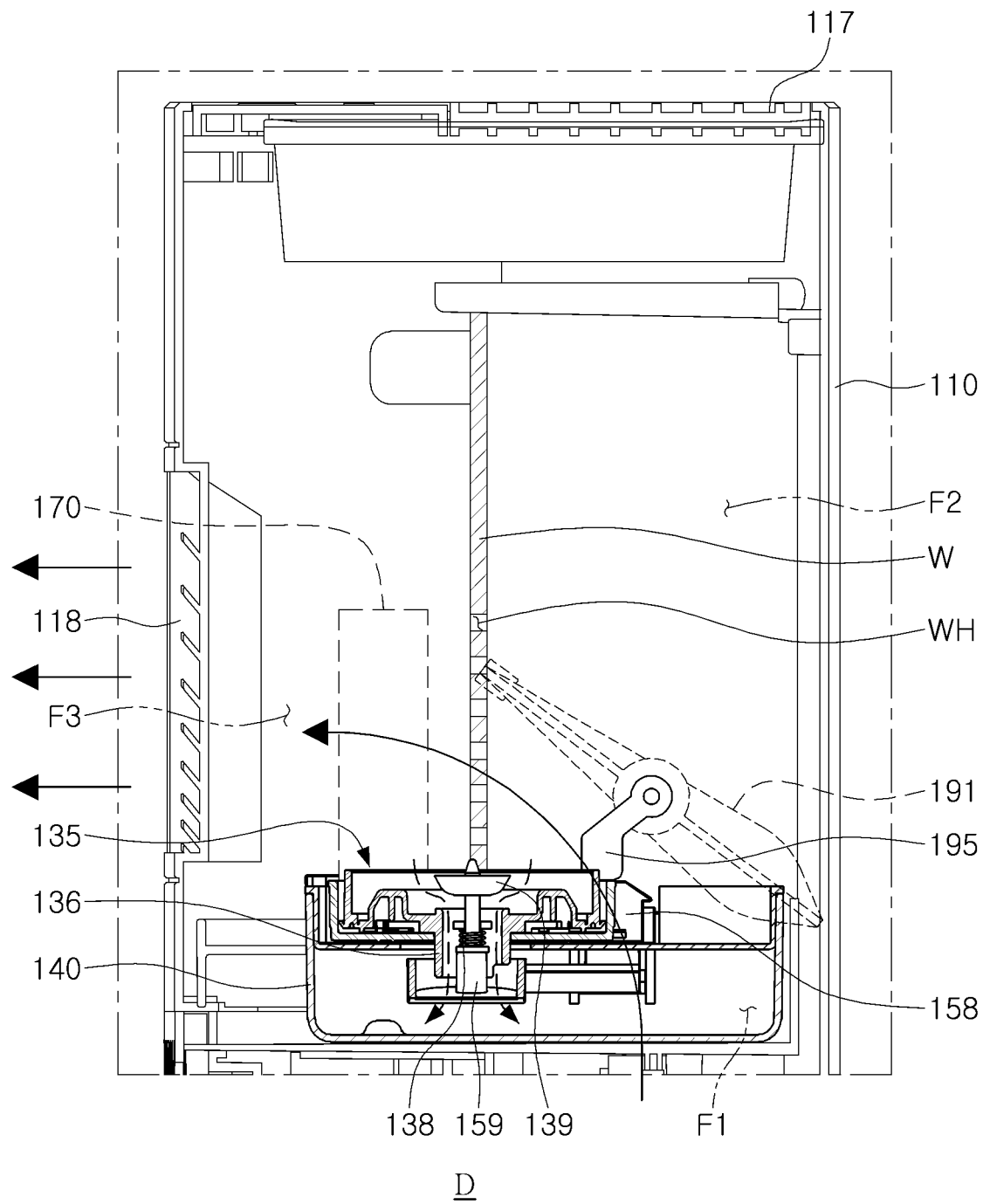
FIG. 9 is an enlarged diagram illustrating a state of a humidification mode with respect to portion D in FIG. 8.
Figure 10:
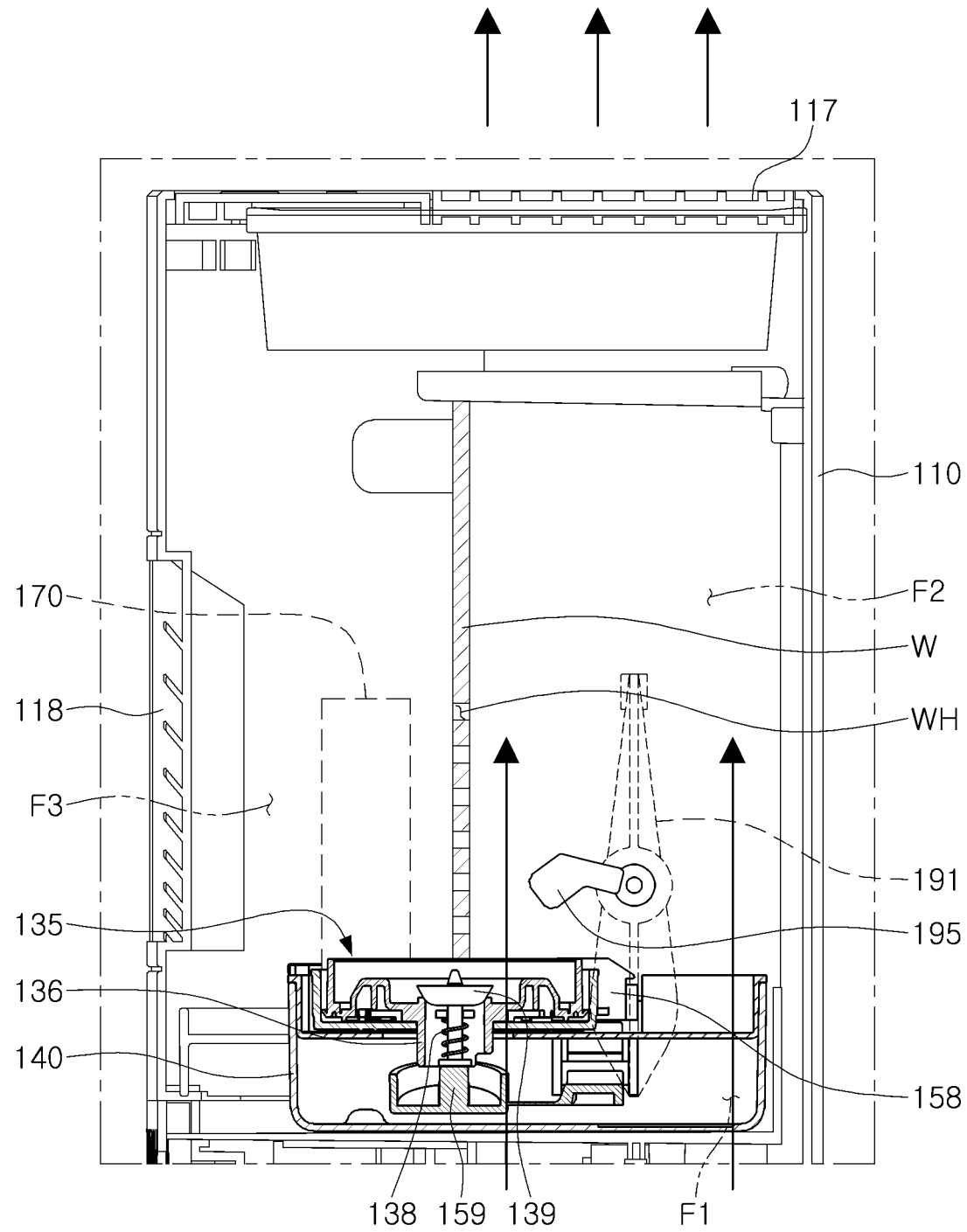
FIG. 10 is an enlarged diagram illustrating a state of an air cleaning mode with respect to portion D in FIG. 8.
Figure 11:
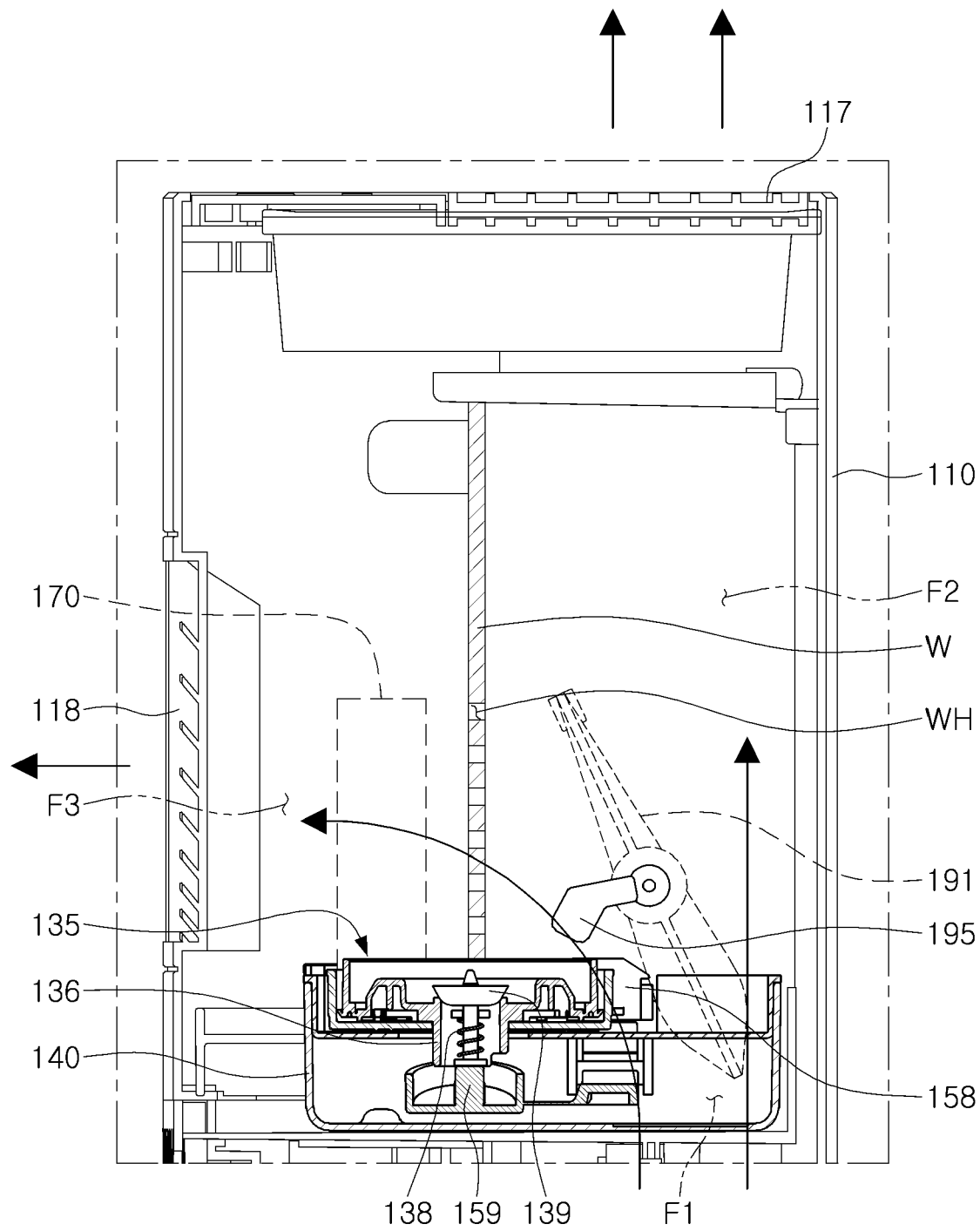
FIG. 11 is an enlarged diagram illustrating a state of a drying mode with respect to portion D in FIG. 8.
Figure 12:
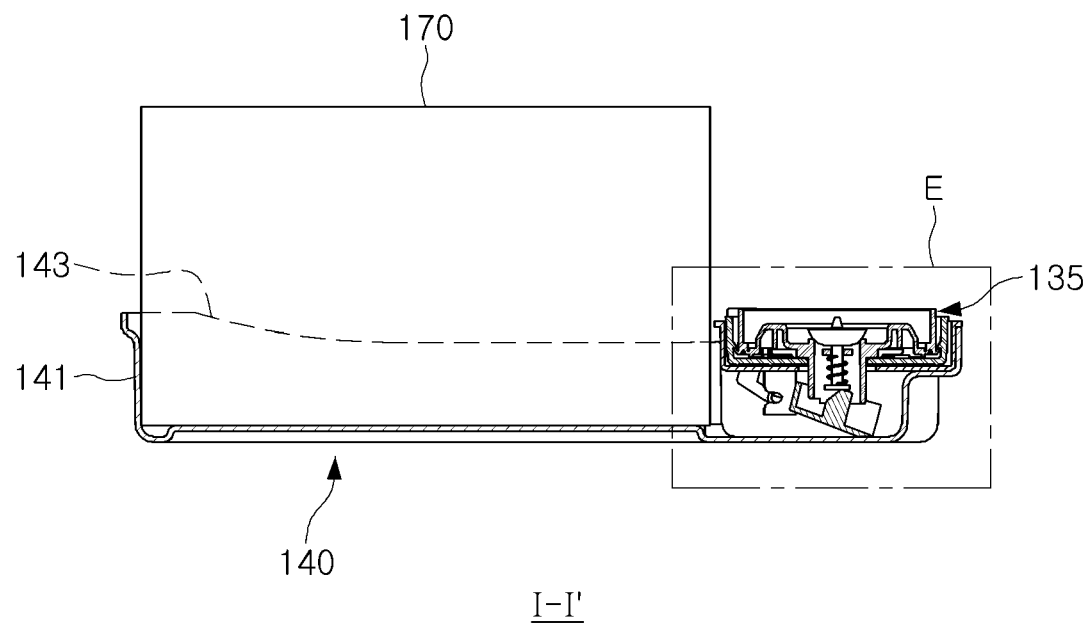
FIG. 12 is a cross-sectional diagram taken along line I-I' in FIG. 3.

FIG. 1 is a perspective diagram illustrating a humidifier 100 according to an embodiment of the present disclosure, FIG. 2 is a perspective diagram illustrating a state in which a water container 130, a humidifying member 170, and a water tank unit 140 are separated from the humidifier illustrated in FIG. 1, FIG. 3 is an exploded perspective diagram illustrating a water tank unit 140, a water feed adjusting member 150 and a humidifying member 170 illustrated in FIG. 2, and FIG. 4 is a cross-sectional diagram taken along line A-A' in FIG. 1 after a water container body 131 is removed from the humidifier 100 illustrated in FIG. 1. FIG. 5 is a perspective diagram illustrating the water feed adjusting member 150 illustrated in FIG. 3, (a) and (b) are a perspective diagram illustrating the state in a closed position in which the water feed adjusting member 150 illustrated in FIG. 3 closes the opening/closing valve 135, and a perspective diagram illustrating the state in an open position in which the water feed adjusting member opens the opening/closing valve 135, respectively. FIG. 6 is a diagram illustrating a modified example of a water feed adjusting member 150 illustrated in FIG. 5, where (a) is a perspective diagram in the open position, and (b) is a cross-sectional diagram taken along line B-B' in (a). FIG. 7 is a perspective diagram illustrating a flow path control member 190 and a water supply operation member 195 provided in a humidifier 100 according to an embodiment of the present disclosure. Also, FIG. 8 is a cross-sectional diagram illustrating the humidifier 100 illustrated in FIG. 1, where the upper side portion is a cross-sectional diagram illustrating the state in which the water container body 131 is removed, taken along line A-A' in FIG. 1, and the lower side portion is a cross-sectional diagram illustrating a central portion of a housing 110. FIGS. 9 to 11 are enlarged diagram illustrating states of a humidification mode, an air cleaning mode, and a drying mode with respect to portion D in FIG. 8. FIG. 12 is a cross-sectional diagram taken along line I-I' in FIG. 3. FIGS. 13 to 16 are enlarged diagrams illustrating portion E in FIG. 12, illustrating a closed position of a water feed adjusting member 150, an open position of the water feed adjusting member 150, a state in which a water tank is tilted in an open position in FIG. 14, and a state in which a water feed adjusting member 150 moves to a water feed cut-off position in FIG. 15, respectively. FIG. 17 is a schematic diagram illustrating a configuration of a control unit according to an embodiment of the present disclosure.

As illustrated in FIGS. 1 to 17, the humidifier 100 according to an embodiment of the present disclosure may include a housing 110 forming the exterior of the product, a water container 130 including a water container body 131 and an opening/closing valve 135, a water tank unit 140 including a water tank 141 for accommodating the water discharged from the water container 130, and a humidifying member 170 for performing humidification using the water accommodated in the water tank 141, a blower unit 180 providing blowing force, and a water feed adjusting member 150 installed to move to open and close the opening/closing valve 135, and a controller C for controlling the position of the water feed adjusting member 150. Also, the humidifier 100 according to an embodiment of the present disclosure may further include at least a portion of a water feed operating member 195 configured to move the water feed adjusting member 150, an air purifying filter 120 for purifying air filtering the air, and a flow path adjusting member 190 for adjusting an air flow. Also, the water feed adjusting member 150 may include a space forming member 160 having an opening 163 formed therein to guide the water discharged from the outlet port of the opening/closing valve 135 to the water tank 141.

As illustrated in FIGS. 1 and 2, the housing 110 may include a housing body 111 forming an exterior of the product, a suction port 115 through which external air flows into the housing body 111, and a discharge port 116 through which air passing through the inside of the housing body 111 is discharged to the outside of the housing body 111.

Also, the discharge port 116 may include a humidified air discharge port 118 through which the air flowing into the suction port 115 and filtered in an air purifying filter 120 is discharged through the humidifying member 170, and a clean air discharge port 117 through which the air flowing in from the suction port 115 and passing through the air purifying filter 120 is discharged without passing through the humidifying member 170.

As illustrated in FIG. 1, the housing 110 may have a structure in which a suction port 115 may be formed on a lower portion of a front surface of the housing body 111, a humidified air discharge port 118 may be formed on an upper portion of the front surface of the housing body 111, and the clean air discharge port 117 may be formed on the upper surface of the housing body 111. However, the installation position and the number of the suction port 115 and the discharge port (116; 117, 118) may be varied. For example, the suction port 115 may be installed on a plurality of surfaces among the front, rear, left, and right surfaces of the housing 110 to suction air in various directions. Also, the installation position and the number of the humidified air discharge port 118 and the clean air discharge port 117 may be varied.

Referring to FIG. 8, the housing 110 may include air flow path unit F1, F2, and F3 therein such that the air flowing in from the suction port 115 is discharged through the discharge port (116; 117, 118). Also, referring to FIGS. 2 and 4, a partition 112 may be installed in the housing 110 to partition the opening 113 in which the air flow path units F1, F2, and F3 and the water container 130 are installed.

Referring to FIG. 8, the air purifying filter 120 may be provided in the housing 110. The air purifying filter 120 may be disposed in the air flow path on the rear end of the suction port 115 and may be configured to filter (purify) the air flowing in from the suction port 115. Also, the air purifying filter 120 may be installed in the front-end flow path of the blower unit 180 such that the air flowing in from the suction port 115 is filtered in the air purifying filter 120 and flowing into the blower unit 180.

The air purifying filter 120 may be configured in a rectangular shape corresponding to the shape and cross-sectional area of the air flow path on the rear end of the suction port 115. Accordingly, the entirety of the air flowing in through the suction port 115 of the housing 110 may pass through the air purifying filter 120. However, the shape of the air purifying filter 120 is not limited to the aforementioned rectangular shape, and various general filters may be used. For example, the air purifying filter 120 may be formed of a three-dimensional filter having a circular or quadrangular cross-section and having a space formed therein.

The air purifying filter 120 may be selected from general filters having various shapes and functions for air filtration, and the type, number, and shape of the filters used as the air purifying filter 120 are not limited to the examples illustrated in FIG. 8 and may be varied.

Also, the water container 130 may be installed in the opening 113 of the housing 110 and may include the water container body 131 having a space for accommodating water for humidification therein, and an opening/closing valve 135 coupled to the water container body 131 and opening and closing to allow the water accommodated in the water container body 131 to be discharged.

This water container 130 may have a structure separated from the humidifier 100 such that water may be easily filled in the water container body 131. For example, as illustrated in FIGS. 1 and 2, the water container 130 may be configured to be detachable from the housing 110. Also, the water container body 131 may be configured to form a portion of the exterior of the housing 110, but an example embodiment thereof is not limited thereto.

Also, the opening/closing valve 135 may be configured to be able to open and close to supply the water accommodated in the water container 130 to the water tank 141 of the water tank unit 140. The opening/closing valve 135 may have an outlet port 136 through which water accommodated in the water container body 131 is discharged. A step portion 136a (in FIG. 3) in which a step is partially formed may be formed on the lower end of the outlet port 136. External air may be easily flowing into the water container body 131 through the step portion 136a, and as air flows into the water container body 131, the water accommodated in the water container body 131 may be easily discharged through the outlet port 136.

The opening/closing valve 135 may have, for example, a mechanical valve structure opened and closed by elastic force. A schematic configuration of the opening/closing valve 135 having a mechanical valve structure will be described with reference to FIGS. 13 and 14.

Figure 13:
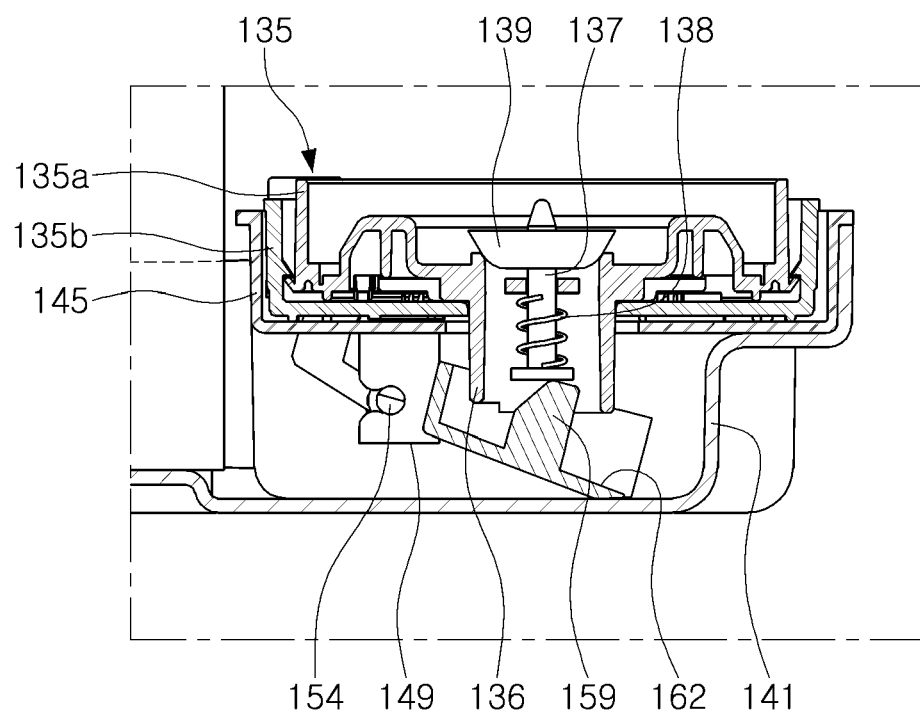
FIG. 13 is a cross-sectional diagram illustrating a closed position of a water feed adjusting member with respect to portion E in FIG. 12.

The opening/closing valve 135 may have a structure in which a cut-off member 139 installed on the upper side of the rod member 137 is elastically supported by an elastic member 138 installed on a rod member 137. The elastic member 138 may include a coil spring wound around the rod member 137. The elastic member 138 may apply elastic force to the cut-off member 139 in a tensile direction. Accordingly, when no external force is applied to the elastic member 138 as illustrated in FIG. 13, the cut-off member 139 may seal and close the upper end of the outlet port 136.

Figure 14:
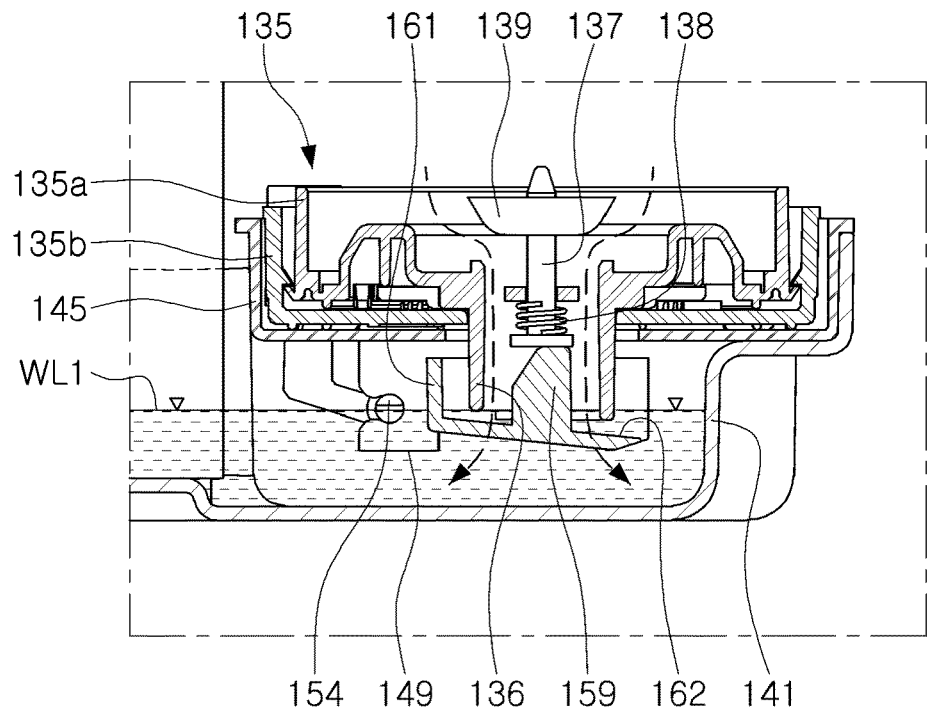
FIG. 14 is a cross-sectional diagram illustrating an open position of the water feed adjusting member with respect to portion E in FIG. 12.

Also, as illustrated in FIG. 14, when external force for pressurizing the rod member 137 upwardly acts on the opening/closing valve 135, the elastic member 138 may be compressed and the rod member 137 and the cut-off member 139 may move upwardly. Accordingly, the cut-off member 139 may open the upper end of the outlet port 136 such that the water accommodated in the water container body 131 may be discharged through the outlet port 136.

Meanwhile, the opening/closing valve 135 may be screwed to the inlet port of the water container body 131 through a cap member 135a and 135b. FIGS. 13 and 14 illustrate the example in which the cap members 135a and 135b may have a double structure formed by two cap members 135a and 135b separated from each other, but the cap member 135a and 135b may be configured to be a single member. Since the opening/closing valve 135 may be a component generally used in the water container 130 of a general humidifier, a further detailed description thereof will not be provided.

Thereafter, the water tank unit 140 may be installed in the housing 110 and may accommodate the water discharged from the water container 130 as the opening/closing valve 135 opens.

Referring to FIGS. 2 and 3, the water tank unit 140 may include a water tank 141 for accommodating the water discharged from the water container 130, and a water tank cover 145 configured to cover at least a portion of an upper portion of the water tank 141 and to include the water container 130 seated thereon.

A cover installation portion 144 in which the water tank cover 145 is installed may be formed on one side (the right side in FIGS. 2 and 3) of the water tank 141, and a humidifying member mounting opening 142 in which the humidifying member 170 is installed may be formed on the other side of the water tank 141 (the left side in FIGS. 2 and 3). Accordingly, the humidifying member 170 may be installed while being immersed in the water accommodated in the water tank 141.

Also, referring to FIGS. 3 and 12, even when the housing 110 is slightly tilted, a water tank upper end 143 may be formed such that one side and the other side thereof in a length direction may be formed on a level higher than a level of a central side thereof such that the water contained in the water tank 141 may not overflow to the outside of the water tank 141.

A water container seating unit 146 in which the opening/closing valve 135 of the water container 130 is seated on the upper surface thereof may be formed on the upper surface of the water tank cover 145 and may support the water container 130 through the water container seating unit 146. Also, an installation opening 147 having a diameter larger than that of the outlet port 136 may be formed on the water tank cover 145 such that the outlet port 136 of the opening/closing valve 135 may pass through the water tank cover 145 and may be exposed to the lower side of the water tank cover 145. An escape groove 148 may be formed in the water tank cover 145 such that the water feed adjusting member 150 may be exposed to the upper side of the water tank cover 145. Also, a water feed adjusting member mounting portion 149 for installing the water feed adjusting member 150 may be provided on the lower surface of the water tank cover 145.

Also, a water sensor LS (in FIG. 17) may be installed in the water tank unit 140 to sense the water level or presence of water accommodated in the water tank 141. The water sensor LS may be configured as a water level sensor for sensing the level of the water accommodated in the water tank 141. However, the water sensor LS is not limited thereto, and may be configured as a sensor for sensing whether water is present on the bottom of the water tank 141. Also, the water sensor LS may be installed in the water tank unit 140 but may be installed on an external side of the water tank 141 to easily clean the water tank 141, such that, when the water tank 141 is coupled, the water sensor LS may be configured to measure the water level or the presence of water using capacitance or the like.

Also, as illustrated in FIG. 2, the water tank unit 140 may be installed to be detachable from the opening 113 of the housing 110 while the water container 130 is separated from the housing 110. In this case, the water tank unit 140 may be separated from the housing 110 by sliding while the humidifying member 170 is mounted on the water tank 141.

The humidifying member (a humidifying filter) 170 may perform humidification using the water supplied from the water container 130 to the water tank 141 of the water tank unit 140.

Referring to FIG. 8, the humidifying member 170 may be installed adjacent to the humidified air discharge port 118 and parallel to the front surface of the housing 110. The humidifying member 170 may be disposed on the rear end of the blower unit 180 on the air flow path. Accordingly, the air flowing by the operation of the blower unit 180 may be humidified while passing through the humidifying member 170 and may be discharged through the humidified air discharge port 118 (see FIG. 9).

As described above, since the air purifying filter 120 is disposed on the front end of the blower unit 180 and the humidifying member 170 is disposed on the rear end of the blower unit 180, when only the air purifying function is performed as described below (see FIG. 10), the air filtered by the air purifying filter 120 may be discharged through the clean air discharge port 117 without passing through the humidifying member 170, such that air cleaning efficiency may increase. Accordingly, even when a blowing fan provided in the blower unit 180 is driven even at a relatively low RPM and low power, a sufficient discharge amount may be secured, and noise may be reduced. Further, when humidification is performed by changing the flow path of the flow path adjusting member 190 described later (see FIG. 9), by allowing the overall air blown from the blower unit 180 to flow toward the humidifying member 170, a humidifying efficiency may increase.

This humidifying member 170 may be configured to have a material or shape having excellent hygroscopicity so as to sufficiently absorb the water contained in the water tank 141 of the water tank unit 140. As an example, the humidifying member 170 may have a structure to be immersed in the water accommodated in the water tank 141 as illustrated in FIGS. 2 and 3. However, the installation structure of the humidifying member 170 is not limited to the above-described structure, and various general vaporization-type humidifying structures such as a rotating disk-type structure may be used. Also, the humidifying member 170 provided in the humidifier 100 according to the present disclosure is not limited to a vaporization type humidifying member, and a specific structure or shape may be varied as long as humidification may be performed using water supplied from the water container 130 to the water tank 141.

Also, as illustrated in FIG. 3, the humidifying member 170 may be mounted on and detached from the water tank unit 140 through a humidifying member mounting opening 142. Also, the humidifying member 170 may be separated from the housing 110 by sliding while being mounted on the water tank unit 140 after the water container 130 is separated from the housing 110.

Meanwhile, the humidifying member 170 may be disposed in the humidification flow path F3 among the air flow path unit F1, F2, and F3 (in FIG. 8), which is the inner side of the partition 112. Accordingly, to allow the water tank unit 140 including the humidifying member 170 to be disposed on the humidification flow path F3, a through-hole through which the water tank unit 140 portion including the humidifying member 170 mounted therein may be drawn in and out may be formed on the side surface of the partition 112.

Also, as illustrated in FIG. 8, the blower unit 180 may provide blowing force such that the air flowing in from the suction port 115 may pass through the air flow path unit F1, F2, and F3 formed between the suction port 115 and the discharge port 116; 117, 118 and may flow to the discharge ports 116; 117, 118.

Referring to FIG. 8, the air flow path unit F1, F2, and F3 may include a blown air flow path F1 disposed on the outlet side of the blower unit 180, a clean flow path F2 through which the air from the blown air flow path F1 flows to the clean air discharge port 117, and a humidification flow path F3 through which the air from the blown air flow path F1 flows to the humidified air discharge port 118.

The specific air flow path of these air flow path unit F1, F2, and F3 may be varied depending on the position of the suction port 115 and the discharge port 116; 117, 118 and the position and the direction of the suction/discharge position of the blower unit 180.

Also, the blower unit 180 may include a blower fan (provided with no reference numeral) for flowing air, and a fan motor (not illustrated) for driving the blower fan, similarly to a general blower used in an air purifier. In FIG. 8, the blower unit 180 may be disposed on the rear side of the air purifying filter 120 with respect to the air flow path and may be suctioned on one side of the blower unit 180, but the installation position and the suction structure of the blower unit 180 may not be limited to the structure illustrated in FIG. 8 and may be varied. For example, the blower fan provided in the blower unit 180 may have a double suction structure.

Also, the water feed adjusting member 150 may be movably installed for opening/closing of the opening/closing valve 135, and as the opening/closing valve 135 is opened and closed, water may be supplied to the water tank 141 or may be cut-off. That is, the water feed adjusting member 150 may be installed in the water tank unit 140 such that the water feed adjusting member 150 may move to an open position (FIG. 14) in which the water feed adjusting member 150 may supply water from the water container 130 to the water tank 141 of the water tank unit 140 by opening the opening/closing valve 135 and a closed position (FIG. 13) in which the water feed adjusting member 150 may cut off water supply from the water container 130 to the water tank 141 by closing the opening/closing valve 135.

Referring FIGS. 3 to 6, the water feed adjusting member 150 may include a body unit 151, a contact portion 158 formed on one side of the body unit 151 and disposed to be pressurized by the water feed operating member 195, a lifting and lowering pressurizing portion 159 formed on the other side of the body unit 151 and disposed to pressurize the opening/closing valve 135, and a rotating shaft portion 154 connecting the contact portion 158 to the lifting and lowering pressurizing portion 159. In this case, the lifting and lowering pressurizing portion 159 may be integrally coupled to the space forming member 160 to be described later. The contact portion 158 may move up and down by driving of the water feed operating member 195, and the lifting and lowering pressurizing portion 159 may correspond to the vertical movement of the contact portion 158 and may rotate around the rotating shaft portion 154. That is, the contact portion 158 and the lifting and lowering pressurizing portion 159 may be configured to rotate around the rotating shaft portion 154. Also, the open position (FIG. 14) may be configured as a position in a state in which the lifting and lowering pressurizing portion 159 rotates at a predetermined angle about the rotating shaft portion 154 from the closed position (FIG. 13). Also, the rotating shaft portion 154 may be rotatably coupled to the water feed adjusting member mounting portion 149 formed on the lower surface of the water tank cover 145.

Referring to FIG. 5, the body unit 151 may have a structure in which two bodies 152 and 153 may be connected to each other such that the body unit 151 may not interfere with an internal wall surface of the water tank 141 when rotating around the rotating shaft portion 154 by being pressurized by the water feed operating member 195 to be described later. That is, the body unit 151 may include a body unit 151 corresponding to one side of the body unit 151 and moving up by being pressurized by the water feed operating member 195, and a second body 153 rotating around the rotating shaft portion 154 according to the first body 152 moving up and down. In this case, a contact portion 158 may be provided on the first body 152, and the lifting and lowering pressurizing portion 159 and the rotating shaft portion 154 may be provided on the second body 153. Also, the second body 153 may include a first extension portion 155 extending toward the first body 152, a second extension portion 156 extending in the opposite direction of the first extension portion 155, and a side extension portion 157 extending in the direction of the lifting and lowering pressurizing portion 159 from the second extension portion 156. In this case, the lifting and lowering pressurizing portion 159 may be connected to the side extension portion 157.

Although the connection structure of the first body 152 and the second body 153 is not specifically illustrated in FIG. 5, the first body 152 and the second body 153 may have a hinge coupling structure such that the rotational movement of the second body 153 is possible as the first body 152 moves up and down. However, the connection structure of the first body 152 and the second body 153 may be varied. For example, the first body 152 may have a structure in which the moving up and down of the first body 152 may be guided by a guide member (not illustrated) formed on the water tank cover 145.

Through this configuration, the water feed adjusting member 150 may have a structure in which the lifting and lowering pressurizing portion 159 may rotate about the rotating shaft portion 154 as an axis and may move up and down as the upward and downward (moving up and down) movement of the contact portion 158. In other words, when the contact portion 158 is pressurized by the water feed operating member 195 and moves downwardly, and when the contact portion 158 moves to the upper side by elastic force of the elastic member 138 provided in the/closing valve 135 as the contact between the water feed operating member 195 and the contact portion 158 is released, the lifting and lowering pressurizing portion 159 and the contact portion 158 of the water feed adjusting member 150 may be configured to rotate about the portion 154 (see the arrows in FIGS. 5 and 6).

Referring to FIG. 14, when the lifting and lowering pressurizing portion 159 moves up as the water feed adjusting member 150 rotates, the cut-off member 139 of the opening/closing valve 135 may be lifted up such that the opening/closing valve 135 may be opened. Accordingly, water accommodated in the water container 130 may be discharged through the outlet port 136 and may be supplied to the water tank 141. As water is supplied to the water tank 141, the water level WL1 of the water tank 141 may rise until the level corresponds to the level of the lower end of the outlet port 136 (the step portion 136a). When the water level WL1 corresponds to the level of the lower end of the outlet port 136, the inflow of air into the water container 130 may be cut off such that the water in the water container 130 may not be discharged, and accordingly, the water level WL1 of the water tank 141 may be maintained to be constant.

Meanwhile, the water feed adjusting member 150 may be installed in the water feed adjusting member mounting portion 149 formed on the water tank cover 145 as illustrated in FIG. 3 may be separated for cleaning of the water feed adjusting member 150 and/or the tank unit 140. Also, since the water feed adjusting member 150 is not installed on the bottom surface of the water tank unit 140 and may be installed on the water tank cover 145 detachable from the water tank 141, the water feed adjusting member 150 may not affect the cleaning of the water tank unit 140. That is, since the structure for pressurizing the opening/closing valve 135 or the structure for installing the water feed adjusting member 150 is not formed on the bottom surface of the water tank 141, there may be an advantage in which the bottom surface of the water tank 141 may be easily cleaned.

Referring to FIGS. 5 and 6, the space forming member 160 may be provided in the water feed adjusting member 150 and may include an opening 163 formed to guide water discharged from the outlet port 136 of the closing valve 135 to the water tank 141 of the water tank unit 140.

The space forming member 160 may be formed around the lifting and lowering pressurizing portion 159 connected to the side extension portion 157 and may be integrally formed with the body unit 151 of the water feed adjusting member 150. Accordingly, when the contact portion 158 is pressurized by the water feed operating member 195, the space forming member 160 may rotate around the rotating shaft portion 154 together with the water feed adjusting member 150.

The space forming member 160 may include a bottom surface 162 corresponding to the lower surface of the outlet port 136 of the opening/closing valve 135 while the water feed adjusting member 150 is disposed in the open position (FIG. 14) as the contact portion 158 is pressurized by the water feed operating member 195, and a sidewall 161 extending upwardly from the bottom surface 162 to surround at least a portion of the circumference of the outlet port 136. Also, the lifting and lowering pressurizing portion 159 of the water feed adjusting member 150 may be formed to protrude upwardly in the center of the bottom surface 162.

The space forming member 160 may guide the water discharged from the outlet port 136 of the opening/closing valve 135 while the water feed adjusting member 150 is disposed in the open position (FIG. 14) to pass through the bottom surface 162 and to flow to the water tank 141 through the opening 163.

Figure 15:
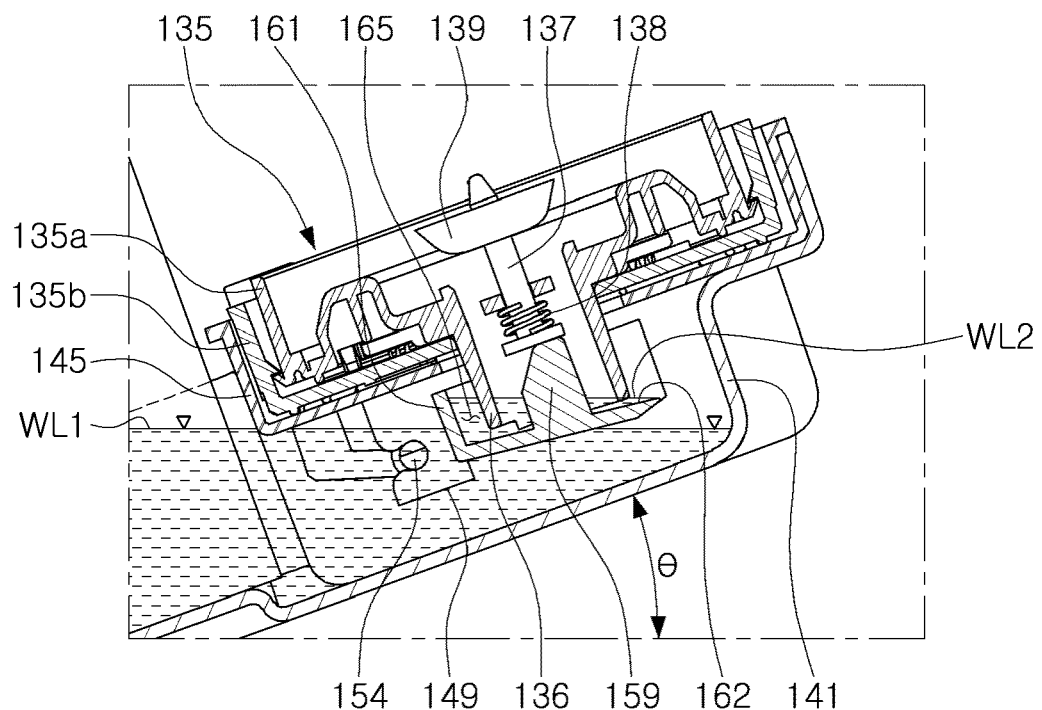
FIG. 15 is a cross-sectional diagram illustrating a state in which a water tank is tilted in an open position of a water feed adjusting member with respect to portion E in FIG. 12.

Also, referring to FIG. 15, when one side of the housing 110/the water tank 141 is lifted and the bottom surface of the housing 110/the water tank 141 is tilted with respect to the horizontal surface, a tilt angle θ may be formed between the bottom surface of the housing 110/the water tank 141 and the horizontal surface. When the tilt angle θ of the housing 100/the water tank 141 becomes a predetermined angle or more, while the water feed adjusting member 150 is disposed in the open position (FIG. 14), a water confinement space 165 for trapping water discharged from the outlet port 136 of the opening/closing valve 135 may be formed in the space forming member 160. When the housing 110 and the water tank 141 are tilted at a predetermined angle or more with respect to the horizontal surface, the water confinement space 165 may be formed between the bottom surface 162 and the sidewall 161.

As such, when the housing 110/the water tank 141 is tilted, the water accommodated in the water tank 141 moves in the direction opposite to the direction in which the water tank 141 is lifted, the water level WL1 of the water tank 141 in the portion in which the water tank 141 is lifted may be lower than the lower end of the outlet port 136 of the opening/closing valve 135. Accordingly, as the water of the water container 130 is continuously discharged, a problem in which the water overflowing the water tank 141 may occur. However, according to the present disclosure, since the water confinement space 165 is formed in the space forming member 160, when the housing 110/the water tank 141 is tilted at a predetermined angle or more, as illustrated in FIG. 15, the water level WL2 of the water confinement space 165 may be disposed on a level higher than a level of the lower end of the outlet port 136. Accordingly, as illustrated in FIG. 15, when the water tank 141 is tilted at a predetermined angle or more while the opening/closing valve 135 is disposed in the open position (FIG. 14), the lower end of the outlet port 136 may be completely accommodated in the water confinement space 165. In this case, since air does not flow into the water container 130 through the outlet port 136, even when the opening/closing valve 135 is open, the water supply from the water container 130 to the water tank 141 may be cut off.

The tilt angle θ of the housing 110/the water tank 141 and/or the volume of the water confinement space 165 to allow the water level WL2 of the water confinement space 165 to be higher than the level of the lower end of the outlet port 136 may be determined by changing by a length of the bottom surface 162 of the space flow member 160, an angle at which the bottom surface 162 is tilted toward the opening 163 side, and a length between the bottom surface 162 and the lower end of the outlet port 136.

Meanwhile, according to an embodiment of the present disclosure, when the tilt angle θ of the water tank 141 is equal to or greater than a predetermined setting value, the water feed operating member 195 may be configured to further pressurize the contact portion 158 in a downward direction. In this case, the water feed adjusting member 150 and the space forming member 160 connected thereto may move to the water feed cut-off position (FIG. 16) corresponding to a position (state) rotated at an angle greater than the rotated angle when moving from the closed position in FIG. 13 to the open position in FIG. 14. In the water feed cut-off position (FIG. 16), a distance between the bottom surface 162 of the space forming member 160 and the lower end of the outlet port 136 of the opening/closing valve 135 may decrease, and the volume of the water confinement space 165 formed between the bottom surface 162 and the sidewall 161 may increase. Accordingly, in the water feed cut-off position (FIG. 16), the lower end of the outlet port 136 of the opening/closing valve 135 may be disposed in a position lower than the water level WL2 of the water confinement space 165 as compared to the open position (FIG. 15). Accordingly, when the housing 110/the water tank 141 is tilted at a predetermined angle or more, by allowing the water confinement space 165 to be formed in the space forming member 160, the water supply from the water container 130 to the water tank 141 may be cut off.

In the example in FIG. 15, the lower end of the outlet port 136 may be accommodated in the water confinement space 165 as the housing 110/the water tank 141 is tilted at a predetermined angle (e.g., 10-15°) or more. Meanwhile, in the water feed cut-off position (FIG. 16), the water confinement space 165 may be formed in advance even at a tilt angle narrower than the example in FIG. 15 such that the lower end of the port 136 may be accommodated in the water confinement space 165, and accordingly, the water supply may be cut off in advance according to the tilting (slope) of the water tank 141 such that the overflow of water accommodated in the water tank 141 may be reliably prevented.

Also, referring to FIGS. 2 and 12, a humidifying member 170 may be installed in the water tank 141, and the water container 130 may be installed on the opposite side of the humidifying member 170 to be separated to the external side of the housing 110. For example, the water container 130 may be installed on one side of the water tank 141 (the right side in FIGS. 2 and 12), and the humidifying member 170 may be installed on the other side of the water tank 141 (the left side in FIGS. 2 and 12), such that the water container 130 and the opening/closing valve 135 provided therein may be eccentrically disposed on one side of the water tank 141 in the length direction (left and right direction in FIG. 12). In this case, the opening 163 of the space forming member 160 may be formed on one side of the water tank 141 in a length direction such that water discharged from the water container 130 may flow to the water tank 141 in the opposite direction of the humidifying member 170.

Referring to FIG. 5, in the space forming member 160, a sidewall 161 may be formed only in a portion of the circumference of the lifting and lowering pressurizing portion 159 to open and close the outlet port 136, and one side of the sidewall 161 may have an open shape. In the case of the space forming member 160 having the shape illustrated in FIG. 5, the opening 163 may be configured as an open end 163a formed by opening one side of the sidewall 161.

As a modified example of the space forming member 160, as illustrated in FIG. 6, the sidewall 161 of the space forming member 160 may be configured to entirely enclose the circumference of the lifting and lowering pressurizing portion 159 to open and close the outlet port 136. In the case of the space forming member 160 having the shape illustrated in FIG. 6, the opening 163 may be configured as a communication opening 163b formed on one side of the bottom surface 162.

Also, as illustrated in FIG. 14, to allow the water discharged from the water container 130 to easily flow to the water tank 141, the bottom surface 162 of the space forming member 160 may be tilted downward in the direction of the opening 163 in the open position (FIG. 14) in which the opening/closing valve 135 is opened.

As such, according to the embodiment of the present disclosure, since the space forming member 160 forming the water confinement space 165 may be integrally formed with the water feed adjusting member 150, the opening 163 direction of the space forming member 160 or the rotation axis direction of the rotating shaft portion 154 may be changed according to the mounting direction of the water tank 141 or the eccentric position of the opening/closing valve 135, such that design freedom of the water tank unit 140 may improve.

The water feed operating member 195 may pressurize the contact portion 158 of the water feed adjusting member 150 or may release the pressurizing on the contact portion 158 such that the water feed adjusting member 150 may rotate around the rotating shaft portion 154. That is, the water feed operating member 195 may be driven such that the water feed adjusting member 150 may be disposed in the open position (FIG. 14) or the closed position (FIG. 13). The driving of the water feed operating member 195 may be performed by the controller C.

Referring to FIGS. 3, 5, and 8 to 11, when the water feed operating member 195 pressurizes the contact portion 158 of the water feed adjusting member 150 to the lower side, the lifting and lowering pressurizing portion 159 may move up with respect to the rotating shaft portion 154 as the center, the opening/closing valve 135 may be opened. That is, as illustrated in FIG. 9, when the lifting and lowering pressurizing portion 159 moves upwardly, the cut-off member 139 of the opening/closing valve 135, which is elastically supported by the elastic member 138, may move upwardly, such that a gap through which water may flow out may be formed between the cut-off member 139 and the upper end of the outlet port 136, and accordingly, water may be supplied from the water container 130 to the water tank unit 140. Also, when the contact (the pressurized state) between the water feed operating member 195 and the contact portion 158 of the water feed adjusting member 150 is released as illustrated in FIGS. 10 and 11, the cut-off member 139 may be in close contact with the upper end of the outlet port 136 by the elastic force of the elastic member 138 provided in the opening/closing valve 135, such that the opening/closing valve 135 may be closed.

This water feed operating member 195 may be configured to operate independently of the other components by an independent driving means to perform a function of pressurizing the contact portion 158 of the water feed adjusting member 150. However, the water feed operating member 195 may rotate together with the flow path adjusting member 190 according to the flow path switching of the flow path adjusting member 190 to be described later and may pressurize the contact portion 158, such that the opening/closing valve 135 may be opened.

Also, the flow path adjusting member 190 may be rotatably disposed on the air flow path units F1, F2, and F3, and may be configured to adjust the air flow to the discharge ports 116; 117, 118.

Referring to FIG. 8, the flow path adjusting member 190 may switch the flow path such that the air flowing through the air flow path units F1, F2, and F3 may be discharged through at least one of the humidified air discharge port 118 and the clean air discharge port 117.

For example, the flow path adjusting member 190 may be configured to rotate between a clean mode position (see FIG. 10) in which the air flowing into the suction port 115, filtered in the air purifying filter 120, and discharged from the blower unit 180 passes through the clean flow path F2 and flow to the clean air discharge port 117, and a humidification mode position (see FIG. 9) in which the air from the blower unit 180 passes through the humidification flow path F3 and flows to the humidified air discharge port 118. That is, the air purified through the air purifying filter 120 may, when the flow path adjusting member 190 is in the humidification mode position illustrated in FIG. 9, pass through the humidifying member 170 and may be discharged through the humidified air discharge port 118 in a humidified state, and when the flow path adjusting member 190 is in the clean mode position illustrated in FIG. 10, the air may be discharged through the clean air discharge port 117 without passing through the humidifying member 170. When the flow path adjusting member 190 is in the humidification mode position (FIG. 9), the water feed adjusting member 150 may be disposed in the open position (FIG. 14), and the flow path adjusting member 190 is in the clean mode position (FIG. 10), the water feed adjusting member 150 may be disposed in the closed position (FIG. 13).

Meanwhile, the flow path adjusting member 190 may be disposed in a third position (a dry mode position) disposed between the clean mode position and the humidification mode position (see FIG. 11), and in this case, the air from the blower unit 180 may be branched into a clean flow path F2 and a humidification flow path F3 and may flow to both the clean air discharge port 117 and the humidified air discharge port 118.

Referring to FIGS. 7 and 8, the flow path adjusting member 190 may include a flow path adjusting body 191 configured to cross the air flow path unit F1, F2, and F3 to open and close at least a portion of the air flow path unit F1, F2, and F3, a shaft member 193 forming a rotation center of the flow path adjusting body 191, and a reinforcing rib 192 for supplementing rigidity of the flow path adjusting body 191.

Also, the flow path adjusting member 190 may be configured to rotate by a driving unit M including a motor or the like. Accordingly, by controlling the driving unit M through the controller C, the flow path adjusting member 190 may rotate between the clean mode position and the humidification mode position.

Meanwhile, the above-described water feed operating member 195 may be configured to rotate integrally with the flow path adjusting member 190 according to the rotation of the flow path adjusting member 190. For example, as illustrated in FIG. 7, as the flow path adjusting body 191 of the flow path adjusting member 190 rotates around the shaft member 193 by the driving of the driving unit M, the water feed operating member 195 may be integrally formed with the shaft member 193 of the flow path adjusting member 190 or may be coupled to the shaft member 193 such that the water feed operating member 195 may rotate together with the flow path adjusting member 190.

Accordingly, the opening/closing of the opening/closing valve 135 provided in the water container 130 may be performed by rotating the water feed operating member 195 together with the flow path adjusting member 190. For example, when humidification is performed through the humidifying member 170 (that is, when the flow path adjusting member 190 is in the humidification mode position), the flow path adjusting member 190 may be in a position in which the humidification flow path F3 is opened, and the water feed operating member 195 may be disposed in a position for pressurizing the contact portion 158 of the water feed adjusting member 150. Accordingly, the opening/closing valve 135 provided in the water container 130 may be opened such that water may be supplied from the water container 130 to the water tank 141. As such, according to an embodiment of the present disclosure, since the opening/closing of the opening/closing valve 135 provided in the water container 130 may be performed by the water feed operating member 195 rotating together with the flow path adjusting member 190, the water supply from the water container 130 to the water tank unit 140 may be efficiently cut of, and a driving means for supplying water to the water tank unit 140 may not be necessary, which may be advantageous.

Meanwhile, referring to FIGS. 2 and 4, the housing 110 may include a partition 112 partitioning the opening 113 in which the water container 130 is installed and the air flow path unit F1, F2, and F3 through which air flows therein. In this case, the water feed adjusting member 150 may be disposed in the opening 113 corresponding to the external side of the partition 112, and the flow path adjusting member 190 may be disposed in the air flow path unit F1, F2, and F3 corresponding to the internal side of the partition 112. However, the water feed operating member 195 connected to the flow path adjusting member 190 may be configured to be exposed to the opening 113 through a through-hole (not illustrated) formed in the partition 112 to pressurize the contact portion 158 of the water feed adjusting member 150 disposed in the opening 113.

The controller C may control the driving of the water feed operating member 195 such that the water feed adjusting member 150 may be disposed in an open position or a closed position. Also, when the housing 110/the water tank 141 is tilted a predetermined angle or more, to prevent the overflow of water from the water tank 141 in advance, the controller C may control the position of the water feed adjusting member 150 when the tilting of the housing 110 is sensed, such that the water feed (water supply) from the water container 130 to the water tank 141 may be cut off. That is, when the slope sensed by the tilt sensor TS is equal to or greater than a predetermined value, the controller C may perform a water feed cut-off mode to control the movement of the water feed operating member 195 such that the water feed adjusting member 150 may move to the water feed cut-off position in FIG. 16.

Also, the controller C may control the water supply from the water container 130 to the water tank 141 and the operation of the blower unit 180. That is, the controller C may perform a clean mode for air cleaning and a humidification mode for humidification by controlling the water supply to the water tank 141 and the driving of the blower unit 180. Further, the controller C may perform a drying mode in which the humidifying member 170 and/or the water tank 141 is dried when the humidification mode is terminated.

Also, by controlling the driving of the flow path adjusting member 190, the controller C may also adjust the rotational position of the flow path adjusting member 190 to induce the air flow according to the clean mode, humidification mode, and dry mode.

First, the water feed cut-off mode will be described with reference to FIGS. 12 to 16.

[Water Feed Cut-Off Mode]

The humidifier 100 according to an embodiment of the present disclosure may include a tilt sensor (TS in FIG. 17) for sensing the tilting (slope) of the housing 110, and the controller C may control the position of the water feed adjusting member 150 based on the sensed tilting value. At least one tilt sensor TS may be installed in the housing 110 and may sense the slope of the housing 110, and accordingly, the slope of the water tank 141 installed in the housing 110 may also be measured.

The controller C may sense the tilting of the housing 110/the water tank 141 through the tilt sensor TS, and when the sensed tilting value is equal to or greater than a predetermined setting value, the water feed adjusting member 150 may be configured to be moved to the water feed cut-off position (FIG. 16) corresponding to the position rotated by an angle greater than the rotation angle when the water feed adjusting member 150 moves from the closed position (FIG. 13) to the open position (FIG. 14).

This movement of the water feed adjusting member 150 may be performed by controlling the movement of the water feed operating member 195. Also, a driving means may be installed for driving the water feed operating member 195, and the controller C may control the movement of the water feed operating member 195 by controlling the driving means, but as described above, the water feed operating member 195 may be configured to rotate together with the flow path adjusting member 190, and the controller C may control the movement of the water feed operating member 195 by controlling the driving of the flow path adjusting member 190.

As described above, the water feed adjusting member 150 may be configured to move from a closed position (FIG. 13) for closing the opening/closing valve 135 to an open position (FIG. 13) for opening the opening/closing valve 135 by rotation. When the housing 110 or the water tank 141 is tilted while the water feed adjusting member 150 is in the open position (FIG. 14), the water contained in the water tank 141 may flow in the opposite direction to the side on which the water tank 141 is lifted, such that the water level in the opposite direction to the side on which the water tank 141 is lifted may increase. When the left side of the water tank 141 is lifted in the state in FIG. 14, the water accommodated in the water tank 141 may flow to the right, and the water level WL1 in the right region of the water tank 141 may rise. When the water level WL1 in the right region of the water tank 141 rises, since the lower end of the outlet port 136 of the opening/closing valve 135 is disposed below the water level WL1 of the water tank 141, the water supply from the water container 130 to the water tank 141 may be automatically cut off. Meanwhile, in the state in FIG. 14, when the right side of the water tank is lifted as illustrated in FIG. 15, the water accommodated in the water tank 141 may flow to the left, and the water level WL1 in the right region of the water tank 141 may decrease. When the water level WL1 in the right region of the water tank 141 rises, since the lower end of the outlet port 136 of the opening/closing valve 135 is disposed below the water level WL1 of the water tank 141, the water supply from the container 130 to the water tank 141 may be continued, such that the overflow of water may occur in the water tank 141.

When the housing 110/the water tank 141 is tilted a predetermined angle or more in the open position (FIG. 14) of the opening/closing valve 135, the water confinement space 165 may be formed in the space forming member 160, and when the lower end of the outlet port 136 is completely accommodated in the water confinement space 165 as illustrated in FIG. 15, the water supply may be cut off. However, the lower end of the outlet port 136 may be completely accommodated in the water confinement space 165 only when the housing 110/the water tank 141 is tilted at a predetermined angle or more.

Figure 16:
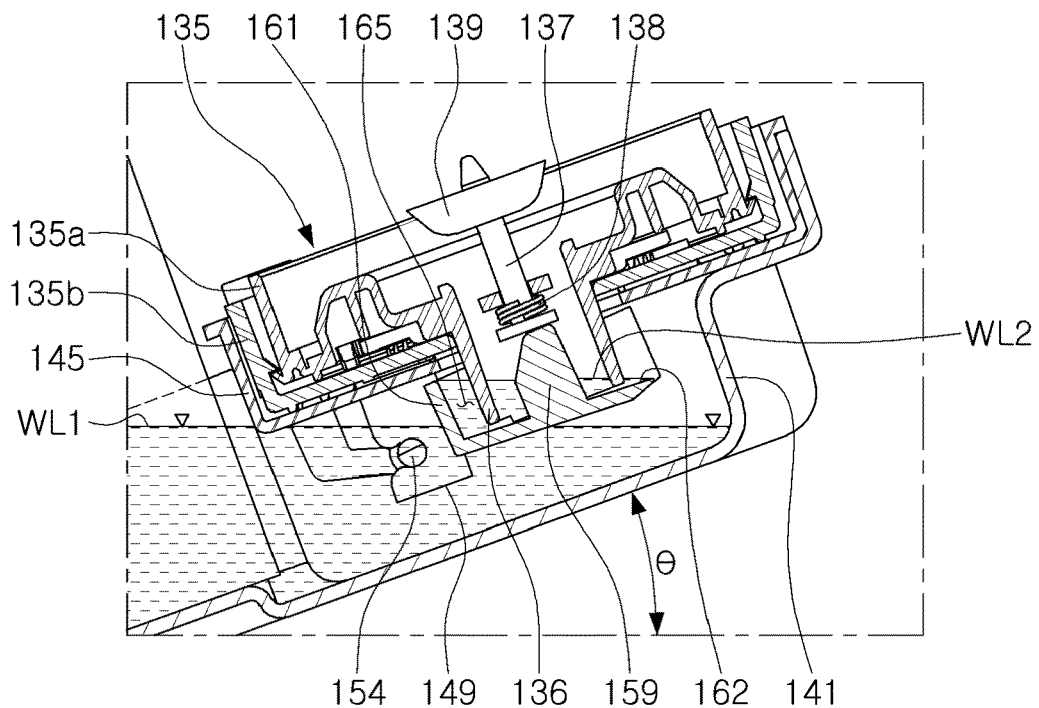
FIG. 16 is a cross-sectional diagram illustrating a state in which a water feed adjusting member moves to a water feed cut-off position in FIG. 15.
Figure 17:
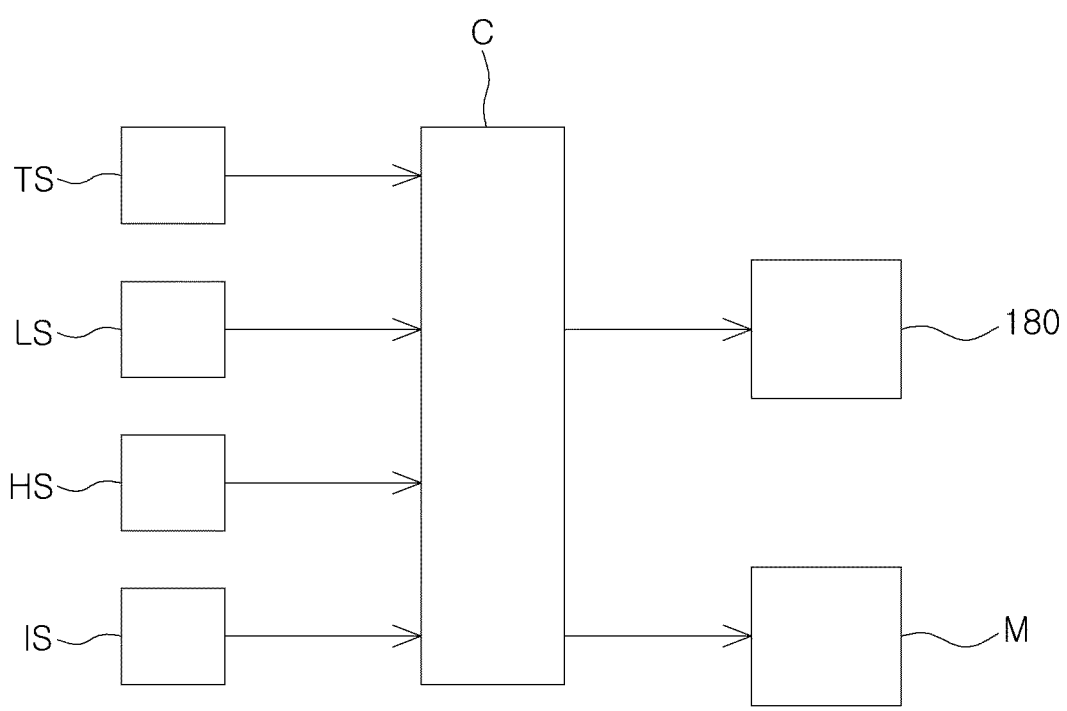
FIG. 17 is a schematic diagram illustrating a configuration of a control unit according to an embodiment of the present disclosure.

In consideration of this configuration, in the water feed cut-off mode, even then the housing 110/the water tank 141 is not tilted a predetermined angle or more, when the tilt value sensed by the tilt sensor TS is equal to or greater than a predetermined setting value, the rotation angle of the water feed adjusting member 150 may be increased further than the open position (FIG. 14) such that the water feed adjusting member 150 may be disposed in the water feed cut-off position (FIG. 16). Accordingly, when the slope value is equal to or greater than the setting value, the water supply may be cut off by forming the water confinement space 165 in the space forming member 160 in advance. Accordingly, since the water supply may be cut off even at a small tilt angle, the overflow of the water tank 141 may be reliably prevented.

Meanwhile, as described above, when the left side of the water tank 141 is lifted in the state in FIG. 14, the water supply from the water container 130 to the water tank 141 may be automatically cut off, such that, as illustrated in FIG. 15, when the right region of the water tank 141 in which the/closing valve 135 is disposed is lifted, the water supply may be cut off. In this case, the controller C may be configured to perform a water feed cut-off mode when the tilt angle generated by lifting the right region of the water tank 141 in which the opening/closing valve 135 is disposed is equal to or greater than a setting value. However, to more reliably prevent the overflow of water in the water tank 141, the controller C may be configured to perform the water feed cut-off mode when the tilt angle in any direction is equal to or greater than a setting value.

Hereinafter, a clean mode, a humidification mode, and a drying mode will be described with reference to FIGS. 9 to 11.

[Clean Mode]

First, as illustrated in FIG. 9, in the case of the clean mode, the controller C may control a position of the flow path adjusting member 190 to allow the path adjusting member 190 to face in the vertical direction and may drive the blower unit 180 such that the clean flow path F2 of the air flow path units F1, F2, and F3 may be opened. When the flow path adjusting body 191 of the flow path adjusting member 190 is installed in parallel to the clean flow path F2 as above, the air blown from the blower unit 180 may, due to flow resistance of the humidifying member 170 installed in the humidifying member F3, pass through the open clean flow path F2 and may be discharged through the clean air discharge port 117.

In this case, since the water feed operating member 195 connected to the flow path adjusting member 190 is spaced apart from the contact portion 158 of the water feed adjusting member 150 (not in contact), the lifting and lowering pressurizing portion 159 of the water feed adjusting member 150 may not pressurize the opening/closing valve 135. Accordingly, the cut-off member 139 provided in the opening/closing valve 135 may maintain a closed state by elastic force of the elastic member 138, and the water supply from the water container 130 to the water tank unit 140 may be prevented.

When the blower unit 180 is driven in the flow path state of this clean mode, the air flowing in from the suction port 115 may be filtered by passing through the air purifying filter 120 and may be discharged to the clean air discharge port 117 through the clean flow path F2 without passing through the humidifying member 170.

[Humidification Mode]

Thereafter, as illustrated in FIG. 10, in the humidification mode, the controller C may control the position of the flow path adjusting member 190 such thin the position of the flow path adjusting member 190 may be disposed in a direction crossing a transverse cross-section of the clean flow path F2, for example, in a tilted direction, such that the clean flow path F2 of the air flow path units F1, F2, and F3 may be closed. That is, the flow path adjusting member 190 may be disposed such that the upper end of the flow path adjusting body 191 may be tilted toward a humidified air discharge port 118. In this case, the upper end of the flow path adjusting body 191 of the flow path adjusting member 190 may be adjacent to the partition wall W and the lower end may be adjacent to the opposite side of the partition wall W, such that the air flow to the clean flow path F2 may be cut off and the air flowing through the air flow path unit may flow into the humidification flow path F3 through a through-hole WH formed in the partition wall W. Accordingly, the air blown from the blower unit 180 may be humidified through the humidifying member 170 and discharged to the outside of the housing 110 through the humidified air discharge port 118.

When performing this humidification mode, the controller C may control the movement of the water feed adjusting member 150 and may drive the blower unit 180 such that the opening/closing valve 135 is in an open state. Specifically, when the humidification mode is performed, the controller C allow the water feed operating member 195 connected to the flow path adjusting member 190 to be in contact with the contact portion 158 of the water feed adjusting member 150 and to be in a state of pressurizing the contact portion 158. Accordingly, the contact portion 158 of the water feed adjusting member 150 may be moved in the downward direction with respect to the rotating shaft portion 154, and the lifting and lowering pressurizing portion 159 of the water feed adjusting member 150 may move in the upward direction with respect to the rotating shaft portion 154. Also, the lifting and lowering pressurizing portion 159 of the water feed adjusting member 150 may pressurize the rod member 137 of the opening/closing valve 135 upwardly, such that the cut-off member 139 may move upwardly. Accordingly, the opening/closing valve 135 is in an open state, such that water may be supplied from the water container 130 to the water tank unit 140.

When the blower unit 180 is driven in the flow path state of the humidification mode as above, the air flowing in from the suction port 115 may be filtered through the air purifying filter 120 and may be in the humidified state by passing through the humidifying member 170 and the humidification flow path F3 and may be discharged to the humidified air discharge port 118.

[Dry Mode]

Also, as illustrated in FIG. 11, the controller C may perform a drying mode to dry the humidifying member 170 and/or the water tank 141 after the humidifying mode is terminated. When performing the drying mode, the controller C may allow the water supply from the water container 130 to the water tank 141 to be in a cut-off state and may drive the blower unit 180 to dry the water absorbed by the humidifying member 170 and/or the water accommodated in the water tank 141.

Also, the controller C may, when the drying mode is performed, control the movement of the water feed adjusting member 150 such that the opening/closing valve 135 is in a closed state. That is, when the flow path adjusting member 190 rotates from the humidifying mode position to the dry mode position by the controller C, the contact between the water feed operating member 195 connected to the flow path adjusting member 190 and the contact portion 158 of the water feed adjusting member 150 may be released, such that the lifting and lowering pressurizing portion 159 of the water feed adjusting member 150 may move downwardly by the elastic force of the elastic member 158. As the opening/closing valve 135 is closed by this elastic force, the water supply from the water container 130 to the water tank unit 140 may be cut off.

Also, the controller C may control the position of the flow path adjusting member 190 such that the flow path adjusting member 190 may have a third position (dry mode position) disposed between the clean mode position and the humidification mode position to perform the drying mode after the humidification is terminated, and in this state, the blower unit 180 may be driven to dry the water absorbed by the humidifying member 170 and/or the water accommodated in the water tank 141.

Specifically, as illustrated in FIG. 11, the tilt angle of the flow path adjusting member 190 with respect to the vertical direction may be smaller than the tilt angle in the vertical direction in the humidification mode position in FIG. 10. In this case, the upper end of the flow path adjusting member 190 may be in a state of being slightly spaced apart from the partition wall W, and the lower portion may be in a state of being slightly spaced apart from the opposite side of the partition wall W, such that some air may flow into the clean flow path F2 and some air may flow into the humidification flow path F3 through the through-hole WH formed in the partition wall W. Accordingly, the air passing through the humidifying member 170 may perform drying of the humidifying member 170. Also, the humidifying member 170 may have a structure capable of absorbing water accommodated in the water tank unit 140, and in this case, the water contained in the water tank 141 of the water tank unit 140 may be performed as the humidifying member 170 is dried.

In this case, to increase drying efficiency, the position of the flow path adjusting member 190 in the drying mode may be determined to sufficiently secure the amount of air blown into the humidification flow path F3. For example, the position of the flow path adjusting member 190 may be slightly rotated from the humidification mode position such that the contact between the water feed operating member 195 and the contact portion 158 of the water feed adjusting member 150 is released and the opening/closing valve 135 is closed.

Meanwhile, the controller C may adjust the amount of air blown of the blower unit 180 based on at least one of illuminance and relative humidity when performing the drying mode.

For example, when the measured illuminance sensed by the illuminance sensor (IS in FIG. 17) is less than or equal to a predetermined reference illuminance value such as at night (bedtime), the controller C may reduce the amount of air blown of the blower unit 180 for quiet operation.

Also, when the measured relative humidity is equal to or greater than a predetermined reference relative humidity value, there may be large amount of water vapor in the air and the drying of the humidifying member 170 and the water tank 141 may not be smoothly performed, and accordingly, the controller C may increase the amount of air blown as compared to the case in which the humidity is smaller than the reference relative humidity value. In this case, the measured relative humidity may be acquired through various well-known sensors such as the temperature-humidity sensor HS illustrated in FIG. 17.

Also, the controller C may minimize the amount of air blown when the measured illuminance is less than or equal to the predetermined reference illuminance value, and when the measured illuminance is greater than the predetermined reference illuminance value, the controller C may increase the amount of air blown by comparing the measured relative humidity with the predetermined reference relative humidity value.

This increase/decrease in the amount of air blown may be performed by adjusting the driving RPM of the blower unit 180. A case in which the blowing operation of the humidifier 100 is configured to include five stages from the lowest RPM, stage 1, to the highest RPM, stage 5, will be described as an example. When the measured illuminance is less than or equal to a predetermined reference illuminance value, the blower unit 180 may be driven at the lowest RPM, stage 1, so as not to disturb a user's rest (sleep) (for quiet operation). Also, when the measured illuminance is greater than the predetermined reference illuminance value, the blower unit 180 may be driven at stage 2 or higher, higher than stage 1. Also, When the measured relative humidity is higher than the reference relative humidity value, there may be a large amount of water vapor in the air, and accordingly, the blower unit 180 may be driven at stage 4 or 5 for swift drying operation. When the measured relative humidity is less than the reference humidity value, the blower unit 180 may be driven at stage 3 or 2 such that the amount of air blown is less than the case in which the humidity is the reference relative humidity value or more.

Alternatively, with reference to the blowing operation corresponding to the current air condition (e.g., the amount of dust), the driving may be performed by increasing or decreasing the blowing operation depending on illuminance or relative humidity. For example, in the case in which the setting value of the blowing stage corresponding to the current air condition (e.g., the amount of dust) is stage 3, when the measured illuminance is less than or equal to the predetermined reference illuminance value, the blower unit 180 may be driven at a blowing stage (e.g., stage 1 or 2) lower than the current setting blowing stage (stage 3), and when the measured illuminance is greater than the predetermined reference illuminance value, the current setting blowing stage (stage 3) may be maintained or the blower unit 180 may be driven at stage 4 or 5 higher than the current setting blowing stage (stage 3) to perform a swift drying operation. Also, When the measured relative humidity is higher than the reference relative humidity value, the blower unit 180 may be driven at stage 4 or 5 higher than the current setting blowing stage (stage 3) to perform a swift drying operation, and when the measured relative humidity is smaller than the reference relative humidity value, the current setting blowing stage (stage 3) may be maintained or the blower unit 180 may be driven at stage 2 or 1 higher than the current setting blowing stage (stage 3).

Meanwhile, the predetermined reference illuminance value or the reference relative humidity value described above may be configured as a single value or may include two or more values. When there are two or more reference illuminance values or reference relative humidity values as above, the increase/decrease in the amount of air blown may be controlled in response to a section corresponding to the measured illuminance or the measured relative humidity. As such, the method of controlling or increasing/decreasing the amount of air blown in consideration of illuminance or relative humidity is not limited to the above-described methods and may be varied.

Also, the controller C may allow the drying mode to be performed for a predetermined drying time. The drying setting time may be predetermined in consideration of the amount of water accommodated in the water tank 141 and the amount of water absorbed by the humidifying member 170. Meanwhile, as described above, the controller C may increase or decrease the amount of air blown of the blower unit 180 based on at least one of illuminance and the relative humidity, and in this case, the drying setting time may be determined in consideration of the increase/decrease in the amount of air blown.

Meanwhile, the water absorbed by the humidifying member 170 and/or the water contained in the water tank 141 is dried by driving the blower unit 180 in a state in which the controller C cuts off the water supply from the water container 130 to the water tank 141, the water contained in the water tank 141 may be gradually consumed. Accordingly, the water level of the water accommodated in the water tank 141 may be gradually lowered, and finally, the water sensor LS may sense that the water level of the water tank 141 may become the floor level, or that there may be no water at the bottom of the water tank 141.

Even after no water is sensed in the water tank 141 through the water sensor LS as described above, the humidifying member 170 may maintain the moisture absorption state for a predetermined period of time. Accordingly, to completely dry the water absorbed by the humidifying member 170, the controller C may additionally perform a drying mode for a predetermined additional drying time after no water is sensed in the water tank 141.

In this case, the additional drying time may be predetermined in consideration of the amount of water absorbed by the humidifying member 170. Meanwhile, as described above, the controller C may increase or decrease the amount of air blown of the blower unit 180 based on at least one of illuminance and relative humidity, and in this case, the additional drying time may be determined in consideration of the increase or decrease in the amount of air blown.

When the blower unit 180 is driven in the flow path state of the drying mode, a portion of the air flowing in from the suction port 115 may be filtered by passing through the air purifying filter 120, may dry the water absorbed by the humidifying member 170 and/or the water contained in the water tank 141 while passing through the humidifying member 170 and the humidification flow path F3, and may be discharged to the humidified air discharge port 118, and a portion of the air may be filtered by passing through the air purifying filter 120, and may be discharged to the clean air discharge port 117 through the clean flow path F2 without passing through the humidifying member 170.

Meanwhile, with respect to the embodiment of the present disclosure, it has been described that the humidifying member 170 may have a state of being immersed in water accommodated in the water tank 141, but the shape, structure, and/or operation method of the humidifying member 170 is not limited to the above-described immersed-type humidifying structure and may be varied as long as the water supplied from the water container 130 to the water tank 141 may be provided to the humidifying member 170 and humidification may be performed. For example, the structure in which water is supplied to the humidifying member 170 may be varied, such as a structure in which water accommodated in the water tank 141 is sprayed to the humidifying member 170, a structure in which the water accommodated in the water container 130 or water tank 141 may flow along the surface of the humidifying member 170 and the water tank 141 may be installed below the humidifying member 170 to accommodate the water flowing down from the humidifying member 170, or a structure in which the humidifying member 170 as a disk shape rotationally driven. Even in this case, the drying mode in which the water contained in the water tank 141 and/or the humidifying member 170 may be dried by blowing air toward the humidifying member 170 while the water supply from the water container 130 to the water tank 141 is cut off may be performed.

Hereinafter, a control method S10 and S100 of the humidifier according to the present disclosure will be described with reference to FIGS. 18 to 24.

The control method S10 and S100 of the humidifier according to the present disclosure may include a control method S10 of the humidifier for cutting off water supply and a control method S100 of the humidifier including a drying operation for drying the water accommodated in the water tank 141.

Hereinafter, the water feed cut-off control method S10 and the drying control method S100 will be described based on the humidifier 100 described with reference to FIGS. 1 to 17, but the humidifier 100 to which the water feed cut-off control method S10 is applied may not be limited to the humidifier 100 described with reference to FIGS. 1 to 17 and the specific humidification method is not limited as long as the water supply (whether water is supplied) from the water container 130 to the water tank 141 may be adjusted. Also, the humidifier 100 to which the water feed cut-off control method S10 and the drying control method S100 according to the present disclosure are applied is not limited to a humidifier having only a humidifying function and may include a humidifying purifier having an air purification function or overall humidifiers including other additional functions.

[Water Feed Cut-Off Control Method S10]

The water feed cut-off control method S10 for cutting off water supply when the housing 110/the water tank 141 is tilted will be described with reference to FIG. 18.

Figure 18:
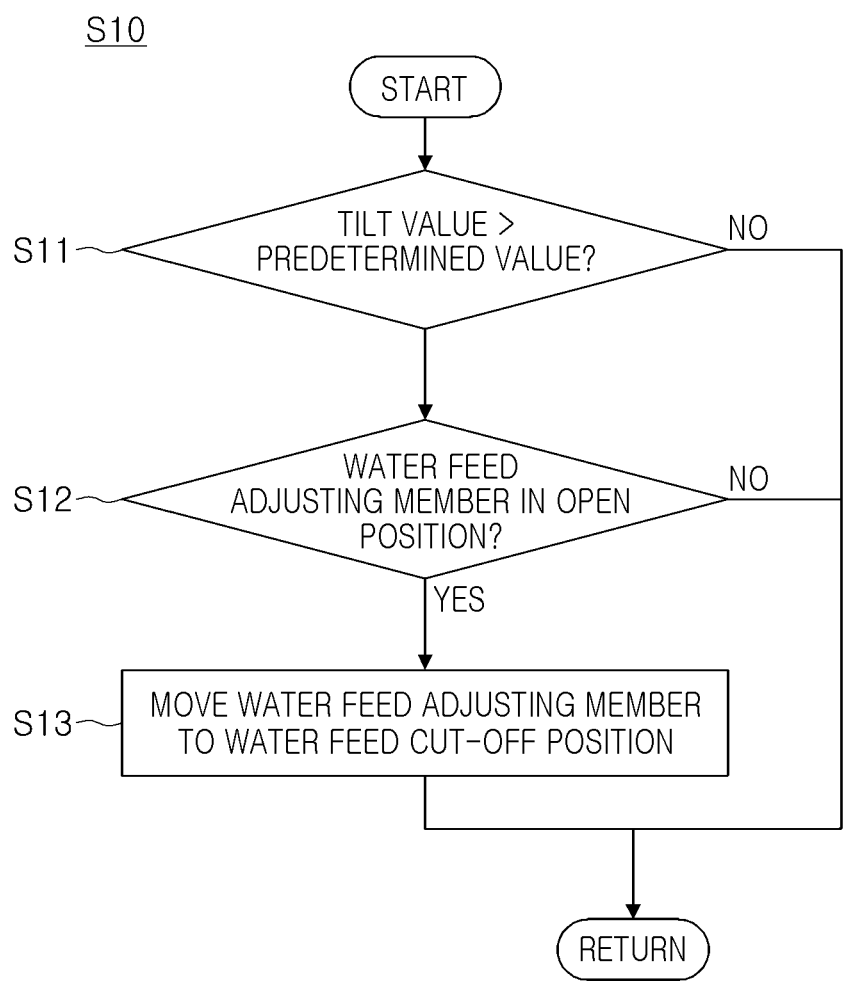
FIG. 18 is a flowchart illustrating a water feed cut-off control method of a humidifier according to an embodiment of the present disclosure.

FIG. 18 is a flowchart illustrating a water feed cut-off control method of a humidifier according to an embodiment of the present disclosure.

As illustrated in FIG. 18, the water feed cut-off control method S10 according to an embodiment of the present disclosure may include an operation S11 of comparing slopes, an operation S12 of determining a position of the water feed adjusting member 150, and an operation S13 of moving the water feed adjusting member.

First, in the tilt comparison operation S11, it may be determined whether the tilt value of the housing 110/the water tank 141 sensed through the tilt sensor (TS in FIG. 17) is equal to or greater than a predetermined setting value.

In this case, as illustrated in FIG. 15, when the right region in which the opening/closing valve 135 is disposed is lifted, it may be necessary to cut off the water supply, and accordingly, in the operation S11 of comparing slopes, it may be determined whether the tilt angle generated by lifting the right region in which the opening/closing valve 135 is disposed has a setting value or more. However, to more reliably prevent the water tank 141 from overflowing, in the tilting comparison operation S11, whether the measured tilting value of the housing 110 in an arbitrary direction is equal to or greater than a setting value may be compared.

The operation S12 of determining a position of the water feed adjusting member 150 may include determining whether the opening/closing valve 135 is open. When the water feed adjusting member 150 is in the closed position of the opening/closing valve 135, even when the housing 110/the water tank 141 is tilted, the water in the water container 130 may not be discharged, and accordingly, it may not be necessary to cut off the water supply. Accordingly, the movement of the water feed adjusting member 150 may be controlled only when the water feed adjusting member 150 is in the open position of the opening/closing valve 135.

When the measured slope value is equal to or greater than the setting value, and the water feed adjusting member 150 is in the open position, the operation S13 of moving the water feed adjusting member to move the water feed adjusting member 150 from the open position to the water feed cut-off position may be performed. Accordingly, the water confinement space 165 may be formed in the space forming member 160, and the lower end of the opening/closing valve 135 may be immersed in the water confinement space 165, such that water supply may be cut off.

Meanwhile, in FIG. 18, it is illustrated that the operation S12 of determining a position of the water feed adjusting member 150 may be performed after the operation S11 of comparing slopes, but the operation S11 of comparing slopes may be performed after the operation S12 of determining a position of the water feed adjusting member 150.

[Drying Control Method S100]

A control method S100 of the humidifier including an operation of drying the water tank 141 will be described with reference to FIGS. 19 to 24.

Figure 19:
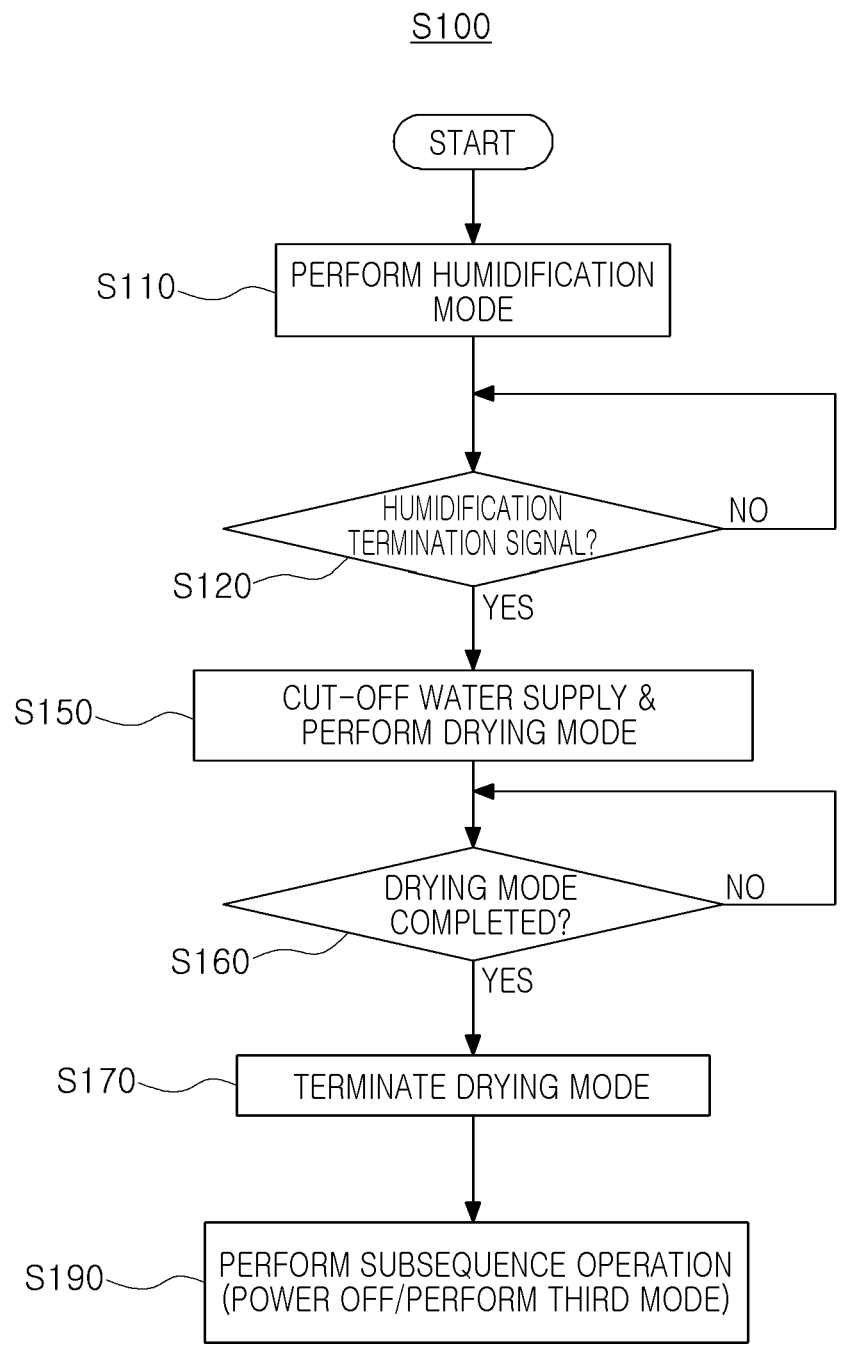
FIG. 19 is a flowchart for a control method of a humidifier including a drying operation according to an embodiment of the present disclosure.

FIG. 19 is a flowchart for a control method S100 of a humidifier including a drying operation according to an embodiment of the present disclosure. FIGS. 20 to 24 are flowcharts illustrating various embodiments of a drying operation of the control method S100 illustrated in FIG. 19.

Referring to FIG. 19, the control method of the humidifier S100 including the drying operation according to an embodiment of the present disclosure may relate to the control method of the humidifier S100 in which humidification may be performed by providing water, supplied from the water container 130 to the water tank 141, to the humidifying member 170, and may include a humidification operation S110 and a drying operation S150 to 170, and may further include a subsequent operation S190 performed after the drying operation.

First, the humidification operation S110 may be configured to perform the humidifying mode in which humidification is performed through the humidifying member 170. This humidification operation S110 may correspond to the humidification mode of the humidifier 100, and the detailed description of the humidification operation S110 will be replaced with the description of the humidification mode described above. This humidification operation S100 may be performed until the humidification termination signal is input, and when the humidification termination signal is input (S120), the humidification mode may be terminated.

This humidification termination signal may include a termination signal for turning off the driving of the humidifier 100, and a third mode performing signal for performing a third mode other than the humidification mode and the drying mode. In this case, the third mode performing signal may include a standby signal for terminating the humidification operation and being hold. The termination signal and the third mode performing signal may be input by a user selection or setting of the humidifier 100.

Also, after the humidification mode is terminated, the drying operation S150-170 of performing the drying mode in which the water tank 141 and/or the humidifying member 170 are dried may be performed.

This drying operation S150 to 170 may include an operation S150 of performing a drying mode in which the drying mode is performed in a state in which the water supply from the water container 130 to the water tank 141 is cut off, an operation S160 of determining whether drying mode is completed, and an operation S170 of terminating the drying mode after the drying mode is completed.

First, the operation S150 of performing a drying mode may correspond to the drying mode of the humidifier 100. Also, the operation S150 of performing a drying mode may be performed in a state in which the water supply valve member 135 is closed, and the operation for closing the water supply valve member 135 in the operation S150 of performing a drying mode will be replaced with the description of the drying mode described above.

Also, in the operation S150 of performing a drying mode, at least a portion of the air blown by the blower unit 180 may be configured to flow to the humidifying member 170. For example, in a state in which the flow path adjusting member 190 is disposed in the position illustrated in FIG. 11, the blower unit 180 may be driven such that a portion of air may pass through the humidifying member 170 and may be discharged through the humidified air discharge port 118, and the other portion of air may be discharged through the clean air discharge port 117.

Meanwhile, the operation S150 of performing a drying mode may be performed in a state in which the humidifying member 170 is immersed in the water tank 141, thereby removing the water accommodated in the water tank 141 through blowing to the humidifying member 170.

Referring to FIGS. 20 to 24, the operation S150 of performing a drying mode may be configured to adjust the amount of air blown based on at least one of illuminance and relative humidity.

Figure 20:
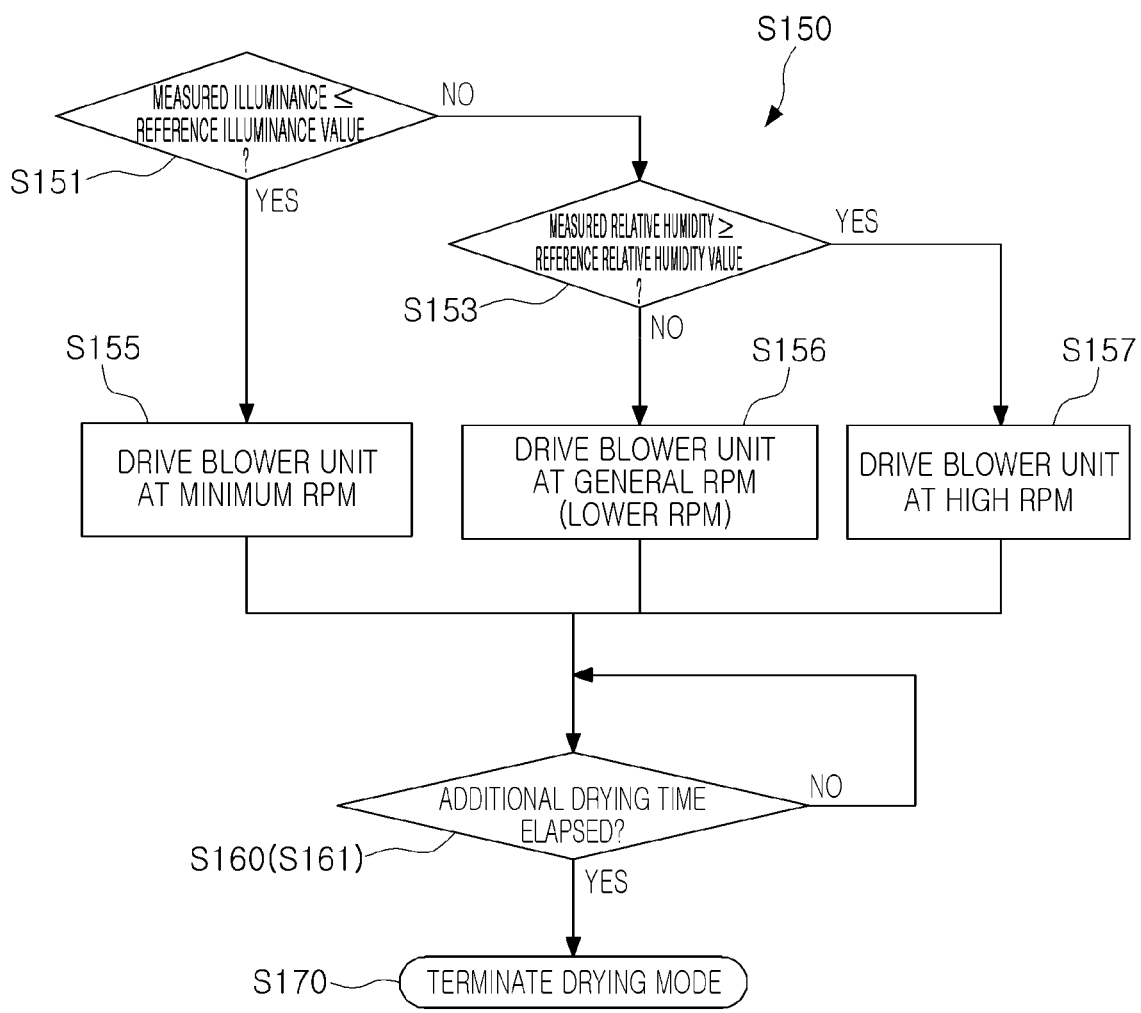
FIGS. 20 to 24 are flowcharts illustrating various embodiments of a drying operation of the control method illustrated in FIG. 19.
Figure 22:
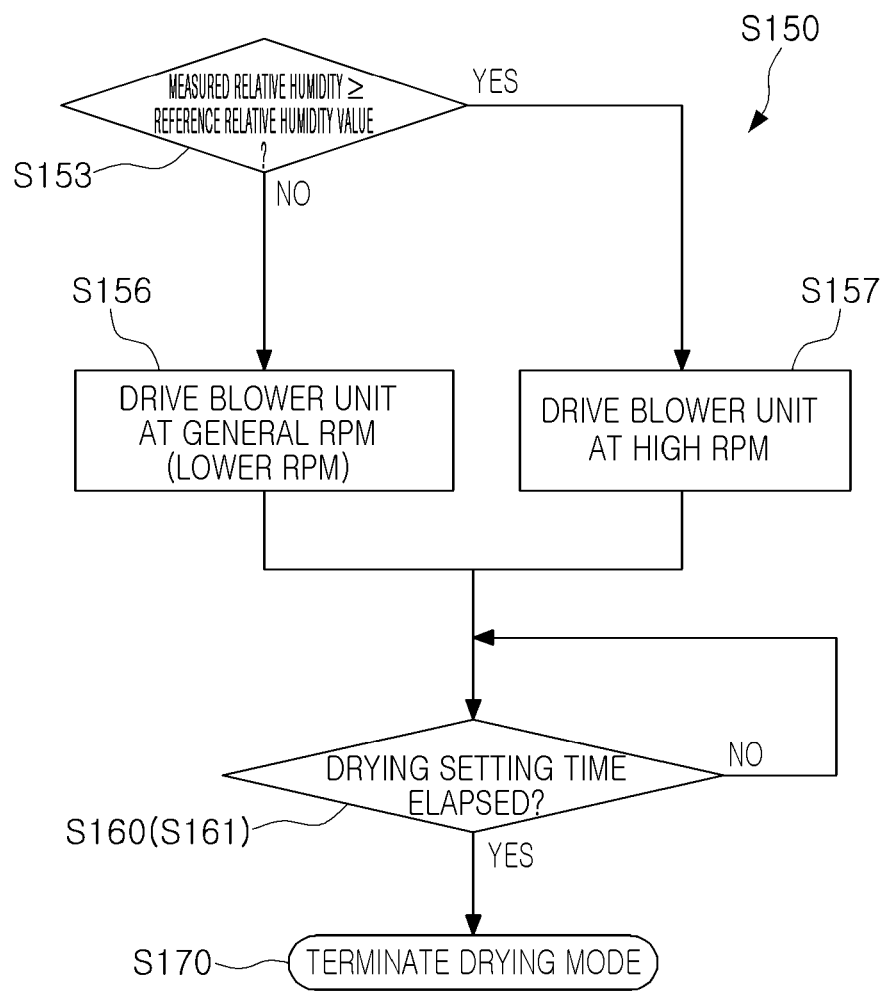
Figure 23:
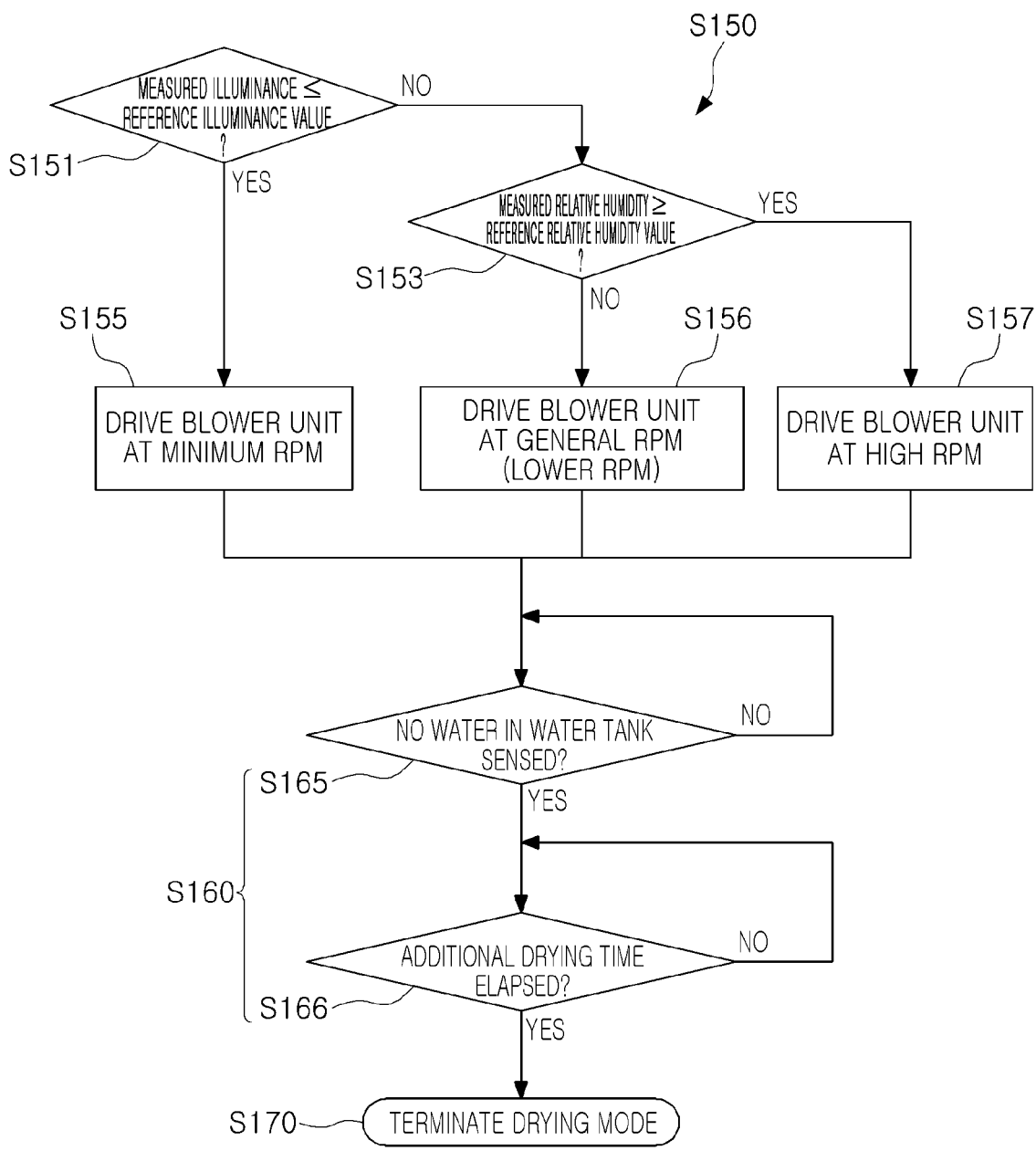

For example, the operation S150 of performing a drying mode may be configured to adjust the amount of air blown in consideration of both illuminance and relative humidity as illustrated in FIGS. 20 and 23. Also, the operation S150 of performing a drying mode may be configured to adjust the amount of air blown in consideration of the illuminance as illustrated in FIGS. 21 and 24, and may be configured to adjust the amount of air blown in consideration of the relative humidity as illustrated in FIG. 22.

Also, in the operation S150 of performing a drying mode, as illustrated in FIGS. 20, 21, 23 and 24, the measured illuminance may be compared with the reference illuminance (S151), and when the measured illuminance is less than or equal to the reference illuminance value, the amount of air blown may be reduced (S155). Also, in the operation S150 of performing a drying mode, as illustrated in FIGS. 20, 22 and 23, the measured relative humidity may be compared with a predetermined reference relative humidity value (S153), and when the measured relative humidity is equal to or greater than the reference relative humidity value, the amount of air blown may be increased (S157) as compared to the amount of air blown (S156) of when the humidity is smaller than the reference relative humidity value.

Referring to FIGS. 20 and 23, in the operation S150 of performing a drying mode, by comparing the measured illuminance sensed by the illuminance sensor (IS in FIG. 17) with the reference illuminance value (S151), when the measured illuminance is less than the reference illuminance value such as at night (bedtime), the blower unit 180 may be driven at the lowest RPM to minimize the amount of air blown (S155). Also, when the measured illuminance is greater than the reference illuminance value, the measured relative humidity may be compared with the reference relative humidity value (S153). When the measured relative humidity is higher than the reference relative humidity value, the drying of the humidifying member 170 may not be smooth due to the large amount of water vapor in the air, and accordingly, the blower unit 180 may be driven at a high RPM to increase the amount of air blown to perform the drying operation swiftly (S157). When the measured relative humidity is smaller than the reference relative humidity value, the blower unit 180 may be driven at a low RPM and may reduce the amount of air blown (S156).

Figure 21:
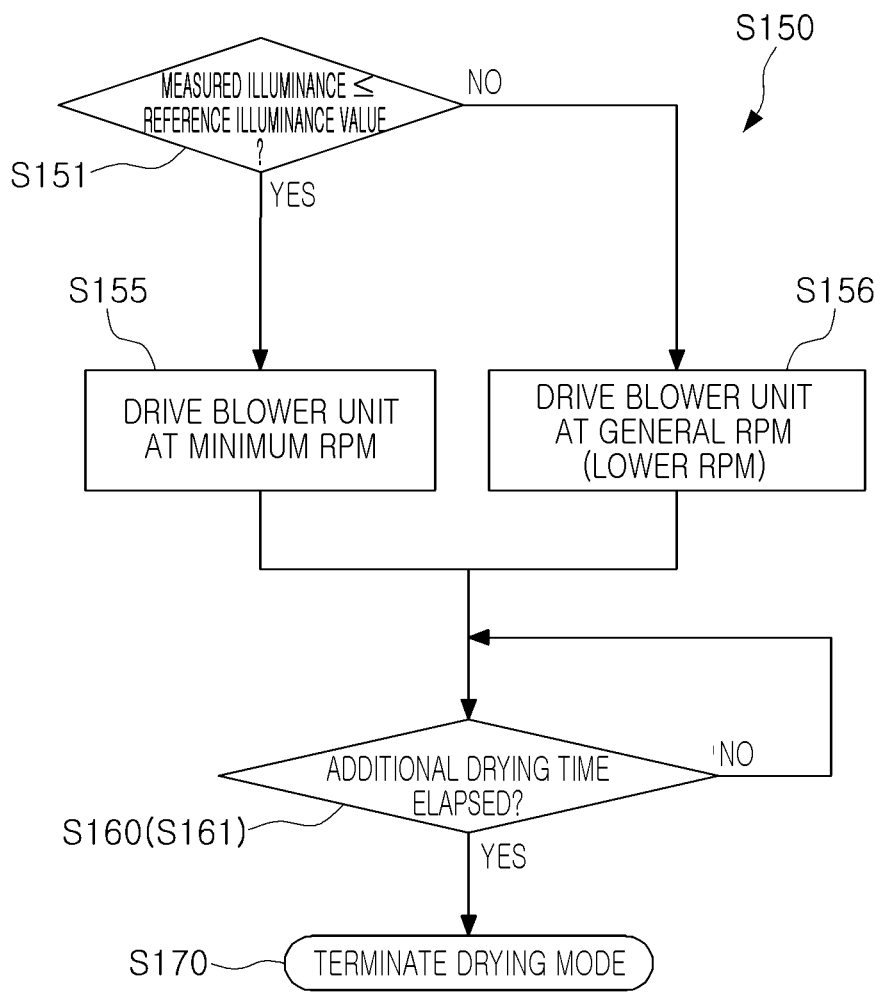
Figure 24:
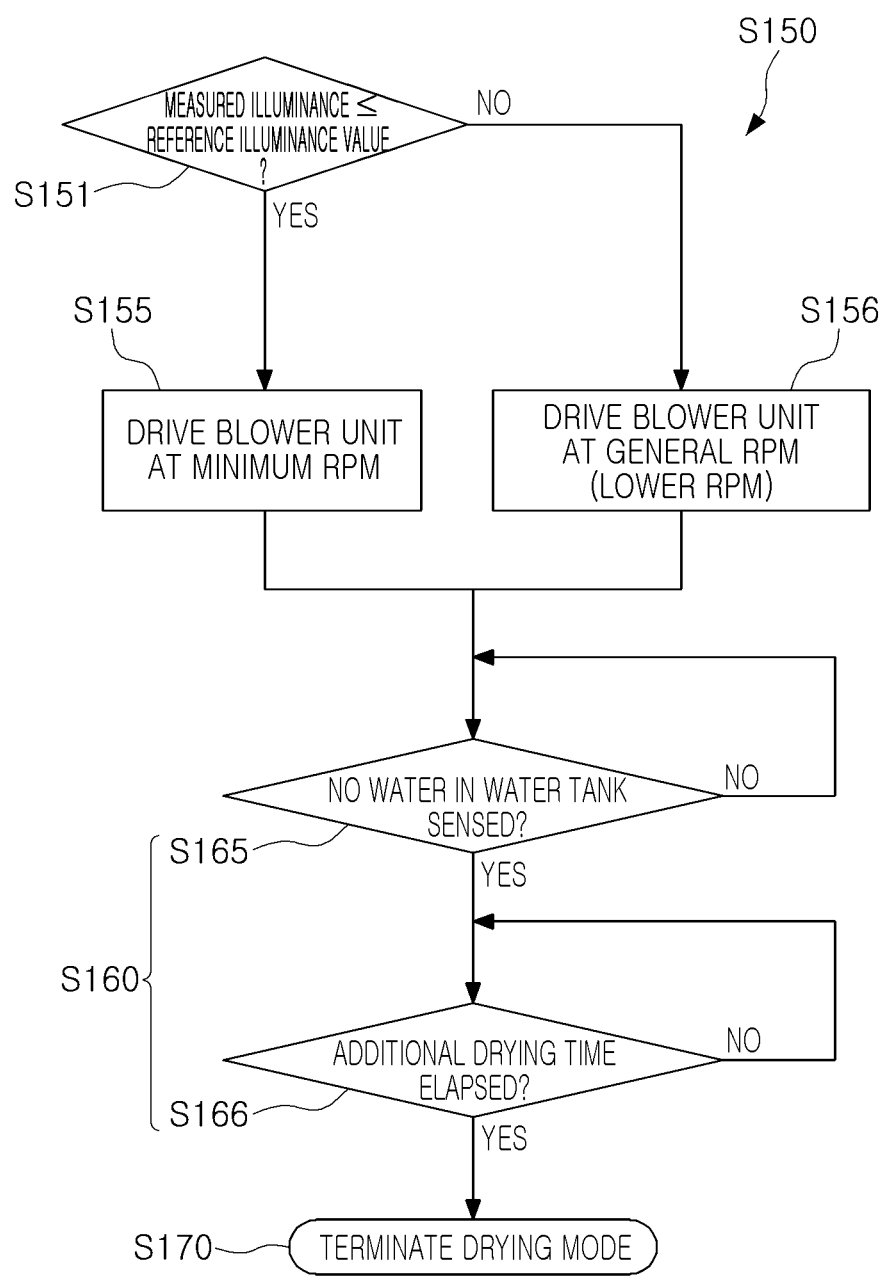

Also, as illustrated in FIGS. 21 and 24, the operation S150 of performing a drying mode may have a configuration in which illuminance may be considered but relative humidity is not considered. In this case, the measured illuminance may be compared with the reference illuminance value (S151), and when the measured illuminance is below the reference illuminance value, such as at night (bedtime), the amount of air blown may be minimized by driving the blower unit 180 at the lowest RPM (S155), and when the measured illuminance is greater than the reference illuminance value, the amount of air blown may be adjusted by driving the blower unit 180 at a low RPM or a general RPM selected depending on air quality (S156).

Also, as illustrated in FIG. 22, the operation S150 of performing a drying mode may have a configuration in which relative humidity may be considered but illuminance is not considered. In this case, the measured relative humidity may be compared with the reference relative humidity (S153), and when the measured relative humidity is equal to or greater than the reference relative humidity, the drying of the humidifying member 170 may not be smooth due to the large amount of water vapor in the air, and accordingly, to swiftly perform the drying operation, the amount of air blown may be increased by driving the blower unit 180 at high RPM (S157), and when the measured relative humidity is less than the reference relative humidity value, the amount of air blown may be reduced by driving the blower unit 180 at a low RPM (S156).

This increase/decrease in the amount of blowing may be adjusted by simply increasing the driving RPM of the blower unit 180 according to the illuminance and/or relative humidity or may be adjusted with reference to the blowing stage corresponding to the current air condition (e.g., the amount of dust) and also, the blowing stage may be increased or decreased according to the illuminance or relative humidity. For example, the example in which the blowing stage of the humidifier 100 may include 5 stages from stage 1, which is the lowest RPM, to stage 5, which is the highest RPM, and the setting value of the blowing stage corresponding to the current air condition (e.g., the amount of dust) is stage 3 will be descried. In this case, When the measured illuminance is less than the reference illuminance value, the blower unit 180 may be driven at a blowing stage (e.g., stage 1 or 2) lower than the current setting blowing stage (stage 3) for quiet operation (S155). When the measured illuminance is greater than the reference illuminance value, the blower unit 180 may be driven at stage 4 or 5 higher than the current setting blowing stage (stage 3) to maintain the current setting blowing stage (stage 3) or to swiftly perform the drying operation (S157). Also, when the measured relative humidity is equal to or greater than the reference relative humidity value, the blower unit 180 may be driven at stage 4 or 5 higher than the current setting blowing stage (stage 3) to swiftly perform the drying operation. When the measured relative humidity is less than the reference relative humidity value, the blower unit 180 may maintain the current setting blowing stage (stage 3) or may be driven at stage 2 or 1 lower than the current setting blowing stage (stage 3).

Meanwhile, the above-described reference illuminance value or reference relative humidity value may be configured as a single value or may include two or more values. When the reference illuminance value or the reference relative humidity value includes two or more values, the increase/decrease in the amount of air blown may be controlled in response to a section corresponding to the measured illuminance or the measured relative humidity.

The method of controlling or increasing/decreasing the amount of air blown in consideration of illuminance or relative humidity as above is not limited to the above-described methods and may be varied.

Also, the operation S160 of determining whether drying mode is completed may be determined according to whether a predetermined drying time has elapsed as illustrated in FIGS. 20 to 22 (S161), and when the drying setting time has elapsed, the drying mode may be terminated (S170).

That is, the drying operation S150-170 may be performed for a predetermined drying time. The drying setting time may be predetermined in consideration of the amount of water accommodated in the water tank 141 and the amount of water absorbed by the humidifying member 170. Meanwhile, as described above, the operation S150 of performing a drying mode may increase or decrease the amount of air blown by the blower unit 180 based on at least one of illuminance and relative humidity. In this case, the drying setting time may be determined in consideration of the increase/decrease in the amount of air blown.

Alternatively, the operation S160 of determining whether the drying mode is completed may include an operation of determining whether no water is sensed in the water tank 141 (S165) and an operation (S166) of determining whether an additional drying time has elapsed after sensing no water in the water tank 141 (S166) as illustrated in FIGS. 23 and 24, and when the additional drying time has elapsed, the drying mode may be terminated S170.

That is, as the operation S150 of performing a drying mode may be performed in a state in which the water supply from the water container 130 to the water tank 141 is cut off, the water contained in the water tank 141 may be gradually consumed, and accordingly, the water level of the water accommodated in the water tank 141 may be gradually lowered, such that there may be no water at the bottom of the water tank 141. As such, even after the absence of water in the water tank 141 is sensed, the humidifying member 170 may maintain the moisture absorption state for a predetermined period time. Accordingly, to completely dry the water absorbed by the humidifying member 170, in the operation S160 of determining whether drying mode is completed, the drying mode may be additionally performed for an additional drying time after no water is sensed in the water tank 141.

In this case, the additional drying time may be predetermined in consideration of the amount of water absorbed by the humidifying member 170. Meanwhile, as described above, the operation S150 of performing a drying mode may increase or decrease the amount of air blown of the blower unit 180 based on at least one of illuminance and relative humidity, and in this case, the additional drying time may be determined in consideration of the increase/decrease in the amount of air blown.

Also, after the drying mode ends S170, a subsequent operation may be performed (S190). As described above, the drying operations S150 to 170 may be performed after the humidification termination signal is input S120, and the humidification termination signal may include a humidifier driving termination signal and a third mode performing signal.

Accordingly, the subsequent operation S190 may turn off the driving of the humidifier 100 in response to the humidifier termination signal or may perform the third mode after the drying operation is terminated (S170). In this case, the third mode performing signal may include an air cleaning mode in which air filtered through the air purifying filter 120 is discharged without passing through the humidifying member 170.

The embodiments of the present disclosure have been described in detail above, but it will be apparent to those of ordinary skill in the art that the scope of the present disclosure is not limited thereto, and various modifications and variations may be made within the scope without departing from the technical spirit of the present disclosure described in the claims. In particular, the present disclosure may include deleting a portion of components not essential in the above-described embodiments, replacing the components with other components, or adding other components. Also, the present disclosure may be configured to include combinations of the components described in the aforementioned embodiments. Also, in the present disclosure, the control configuration by the controller may be implemented in the humidifier and may also be applied to a method of controlling a humidifier by the present disclosure.

DESCRIPTION OF REFERENCE CHARACTERS

100 . . . HUMIDIFIER, 110 . . . HOUSING, 111 . . . HOUSING BODY, 112 . . . PARTITION
113 . . . OPENING, 115 . . . SUCTION PORT, 116 . . . DISCHARGE PORT, 117 . . . CLEAN AIR DISCHARGE PORT
118 . . . HUMIDIFIED AIR DISCHARGE PORT, 120 . . . AIR PURIFYING FILTER, 130 . . . WATER CONTAINER
131 . . . WATER CONTAINER BODY, 135 . . . OPENING/CLOSING VALVE, 136 . . . OUTLET PORT
136A . . . STEP PORTION, 137 . . . ROD MEMBER, 138 . . . ELASTIC MEMBER, 139 . . . CUT-OFF MEMBER
140 . . . WATER TANK UNIT, 141 . . . WATER TANK, 142 . . . HUMIDIFYING MEMBER MOUNTING OPENING
143 . . . WATER TANK UPPER END, 144. COVER INSTALLATION PORTION, 145 . . . WATER TANK COVER
146 . . . WATER CONTAINER SEATING UNIT, 147 . . . INSTALLATION OPENING, 148 . . . ESCAPE GROOVE
149 . . . WATER FEED ADJUSTING MEMBER MOUNTING PORTION, 150 . . . WATER FEED ADJUSTING MEMBER, 151 . . . BODY UNIT
152 . . . FIRST BOY, 153 . . . SECOND BODY, 154 . . . ROTATING SHAFT PORTION
155 . . . FIRST EXTENSION PORTION, 156 . . . SECOND EXTENSION PORTION, 157 . . . SIDE EXTENSION PORTION
158 . . . CONTACT PORTION, 159 . . . LIFTING AND LOWERING PRESSURIZING PORTION, 160 . . . SPACE FORMING MEMBER
161 . . . SIDEWALL, 162 . . . BOTTOM SURFACE, 163 . . . OPENING, 163A . . . OPEN END
163B . . . COMMUNICATION OPENING, 165 . . . WATER CONFINEMENT SPACE, 170 . . . HUMIDIFYING MEMBER

180 . . . BLOWER UNIT, 190 . . . FLOW PATH ADJUSTING MEMBER, 191 . . . FLOW PATH ADJUSTING BODY
192 . . . REINFORCING RIB, 193 . . . SHAFT MEMBER, 195 . . . WATER FEED OPERATING MEMBER
C . . . CONTROLLER, F1 . . . BLOWN AIR FLOW PATH F1, F2 . . . CLEAN FLOW PATH, F3 . . . HUMIDIFICATION FLOW PATH
HS . . . TEMPERATURE-HUMIDITY SENSOR, IS . . . ILLUMINANCE SENSOR, LS . . . WATER SENSOR
M . . . DRIVING UNIT, TS . . . TILT SENSOR, W . . . PARTITION WALL, WH . . . THROUGH HOLE
WL1 . . . WATER LEVEL OF WATER TANK, WL2 . . . WATER LEVEL OF THE WATER CONFINEMENT SPACE

The invention claimed is:

1. A humidifier, comprising:
a housing having a suction port through which air is suctioned and a discharge port through which air is discharged;
a water container mounted in the housing and including a water container body and an opening/closing valve coupled to the water container body and opened and closed to allow water contained in the water container body to be discharged;
a water tank unit including a water tank accommodating the water discharged from the water container;
a humidifying member for performing humidification using the water accommodated in the water tank;
a blower unit for providing blowing force such that air flowing in from the suction port passes through an air flow path unit formed between the suction port and the discharge port and flows to the discharge port;
a water feed adjusting member installed in the water tank unit to move to an open position in which water is supplied from the water container to the water tank unit by opening the opening/closing valve, and a closed position in which water supply from the water container is cut off by closing the opening/closing valve;
a water feed operating member in contact with the water feed adjusting member and moving the water feed adjusting member; and
a controller for controlling driving of the water feed operating member such that the water feed adjusting member is disposed in the open position or the closed position,
wherein the water feed adjusting member includes a space forming member having an opening for guiding water discharged from an outlet port of the opening/closing valve to the water tank unit, and
wherein the space forming member includes a water confinement space for confining water discharged from the outlet port when the housing is tilted at a predetermined angle or more, and
wherein the water feed adjustment member includes a lifting and lowering pressurizing portion integrally coupled to the space forming member and configured to rotate about a rotating shaft portion to be disposed to pressurize the opening/closing valve,
wherein the open position is a position in a state in which the lifting and lowering pressurizing portion rotates at a predetermined angle about the rotating shaft portion from the closed position, and
wherein a water feed cut-off position is a position in a state in which the lifting and lowering pressurizing portion rotates at an angle greater than a rotated angle when the lifting and lowering pressurizing portion moves from the closed position to the open position, and the closed position is a position in which the lower end of the outlet port of the opening/closing valve is submerged in the water contained within the water confinement space.

2. The humidifier of claim 1,
wherein the water feed adjusting member further includes a contact portion disposed to be pressurized by the water feed operating member, and
wherein the rotating shaft portion connects the contact portion to the lifting and lowering pressurizing portion.

3. The humidifier of claim 2,
wherein the contact portion moves in an upward and downward direction by driving of the water feed operating member, and
wherein the lifting and lowering pressurizing portion rotates around the rotating shaft portion in response to a movement of the contact portion in an upward and downward direction.

4. The humidifier of claim 3, further comprising:
a tilt sensor for sensing tilting of the housing; and
wherein, when the tilting sensed by the tilt sensor is equal to or greater than a predetermined value, the controller further controls driving of the water feed operating member such that the water feed adjusting member is disposed in the water feed cut-off position.

5. The humidifier of claim 1, wherein the water tank unit includes a water tank cover for covering at least a portion of an upper portion of the water tank, and
wherein the water feed adjusting member is installed in the water tank cover.

6. The humidifier of claim 1, wherein the water container is disposed eccentrically on one side of the water tank in a length direction, and
wherein the opening of the space forming member is formed on one side of the water tank in the length direction.

7. The humidifier of claim 1, wherein the space forming member includes a bottom surface corresponding to a lower surface of the outlet port in a state in which the water feed adjusting member is disposed in the open position, and a sidewall extending in an upward direction from the bottom surface to surround at least a portion of a circumference of the outlet port, and
wherein the water confinement space is formed between the bottom surface and the sidewall when the housing is tilted at a predetermined angle or more.

8. The humidifier of claim 7, wherein the opening of the space forming member is configured as an open end formed by opening one side of the sidewall, or a communication opening formed on one side of the bottom surface.

9. The humidifier of claim 1, further comprising:
an air purifying filter provided in the housing and filtering air flowing in from the suction port; and
a flow path adjusting member rotatably disposed in the air flow path unit and adjusting an air flow to the discharge port,
wherein the controller controls driving of the water feed operating member by controlling rotation of the flow path adjusting member.

10. A humidifier, comprising:
a housing having a suction port through which air is suctioned and a discharge port through which air is discharged;
a water container mounted in the housing and including a water container body and an opening/closing valve coupled to the water container body and opened and closed to allow water contained in the water container body to be discharged;

a water tank unit including a water tank accommodating the water discharged from the water container;

a humidifying member for performing humidification using the water accommodated in the water tank;

a blower unit for providing blowing force such that air flowing in from the suction port passes through an air flow path unit formed between the suction port and the discharge port and flows to the discharge port;

a water feed adjusting member installed in the water tank unit to move to an open position in which water is supplied from the water container to the water tank unit by opening the opening/closing valve, and a closed position in which water supply from the water container is cut off by closing the opening/closing valve;

a water feed operating member in contact with the water feed adjusting member and moving the water feed adjusting member; and a controller for controlling driving of the water feed operating member such that the water feed adjusting member is disposed in the open position or the closed position, wherein the water feed adjusting member includes a space forming member having an opening for guiding water discharged from an outlet port of the opening/closing valve to the water tank unit, and wherein the space forming member includes a water confinement space for confining water discharged from the outlet port when the housing is tilted at a predetermined angle or more;

the humidifier further comprising:

an air purifying filter provided in the housing and filtering air flowing in from the suction port; and a flow path adjusting member rotatably disposed in the air flow path unit and adjusting an air flow to the discharge port, wherein the controller controls driving of the water feed operating member by controlling rotation of the flow path adjusting member, wherein the discharge port includes a humidified air discharge port through which air flowing into the suction port and passing through the air purifying filter is discharged through the humidifying member, and a clean air discharge port through which air is discharged without passing through the humidifying member, wherein the flow path adjusting member rotates between a humidifying mode position in which air flowing through the air flow path unit is discharged through the humidifying member and a clean mode position in which air is discharged without passing through the humidifying member, and wherein, when the flow path adjusting member is disposed in the humidification mode position, the water feed adjusting member is disposed in the open position, and when the flow path adjusting member is disposed in the clean mode position, the water feed adjusting member is disposed in the closed position.

11. The humidifier of claim 10, wherein the flow path adjusting member includes a flow path adjusting body configured to intersect the air flow path unit to open and close at least a portion of the air flow path unit, and a shaft member forming a rotation center of the flow path adjusting body, and wherein the water feed operating member is coupled to the shaft member and rotates together with the flow path adjusting member.

* * * * *